(12) United States Patent
Williams et al.

(10) Patent No.: US 12,361,613 B2
(45) Date of Patent: Jul. 15, 2025

(54) AUGMENTATION OF DIGITAL IMAGES WITH SIMULATED SURFACE COATINGS

(71) Applicant: SWIMC LLC, Cleveland, OH (US)

(72) Inventors: Preston Williams, Bay Village, OH (US); Brendan Do, North Ridgeville, OH (US); Daniel Cody Richmond, North Ridgeville, OH (US); Michael Dowell, Aurora, OH (US)

(73) Assignee: SWIMC LLC, Cleveland, OH (US)

( * ) Notice: Subject to any disclaimer, the term of this patent is extended or adjusted under 35 U.S.C. 154(b) by 463 days.

(21) Appl. No.: 17/717,871

(22) Filed: Apr. 11, 2022

(65) Prior Publication Data
US 2022/0237832 A1 Jul. 28, 2022

Related U.S. Application Data

(63) Continuation-in-part of application No. PCT/US2020/054939, filed on Oct. 9, 2020.
(Continued)

(51) Int. Cl.
*G06T 11/60* (2006.01)
*G06Q 30/0601* (2023.01)
(Continued)

(52) U.S. Cl.
CPC .......... *G06T 11/60* (2013.01); *G06Q 30/0631* (2013.01); *G06T 7/10* (2017.01); *G06T 7/13* (2017.01); *G06T 7/90* (2017.01); *G06T 11/001* (2013.01); *G06V 10/44* (2022.01); *G06V 10/764* (2022.01); *G06V 10/82* (2022.01); *G06V 20/00* (2022.01); *G06V 20/50* (2022.01); *G06T 2200/24* (2013.01)

(58) Field of Classification Search
None
See application file for complete search history.

(56) References Cited

U.S. PATENT DOCUMENTS 10,475,250 B1   11/2019   Huang et al.
10,498,963 B1*  12/2019   Sorgi .................. H04N 25/58
(Continued)

FOREIGN PATENT DOCUMENTS

EP   2512141 A1   10/2012
EP   3423990 A1    1/2019
(Continued)

OTHER PUBLICATIONS

Boykov et al., "Graph Cuts and Efficient N-D Image Segmentation", International Journal of Computer Vision, vol. 70, No. 2, Nov. 2006, pp. 109-131.
(Continued)

*Primary Examiner* — Andrew G Yang
(74) *Attorney, Agent, or Firm* — Shumaker & Sieffert, P.A.

(57) ABSTRACT

A coating product selection system and method. Recognized objects in an input image can be used to determine one or more dominant colors for determining recommended coating products. An image augmentation system and method for simulating the application of a coating to a surface of the image in a scene. A scene record can store data records related to visualization of a scene such that multiple scene visualization clients can present painted images augmented based on assigned coatings.

18 Claims, 27 Drawing Sheets

Related U.S. Application Data

(60) Provisional application No. 62/914,087, filed on Oct. 11, 2019.

(51) Int. Cl.

| | | |
|---|---|---|
| *G06T 7/10* | (2017.01) | |
| *G06T 7/13* | (2017.01) | |
| *G06T 7/90* | (2017.01) | |
| *G06T 11/00* | (2006.01) | |
| *G06V 10/44* | (2022.01) | |
| *G06V 10/764* | (2022.01) | |
| *G06V 10/82* | (2022.01) | |
| *G06V 20/00* | (2022.01) | |
| *G06V 20/50* | (2022.01) | |

(56) References Cited

U.S. PATENT DOCUMENTS

| | | | |
|---|---|---|---|
| 12,020,357 B2 | 6/2024 | Williams et al. | |
| 2006/0239548 A1* | 10/2006 | Gallafent et al. | G06T 7/11 382/164 |
| 2010/0194776 A1* | 8/2010 | Chong | G01J 3/528 345/594 |
| 2012/0314921 A1* | 12/2012 | Star-Lack | G06T 11/005 382/131 |
| 2015/0193970 A1* | 7/2015 | Liu | G06F 3/011 345/420 |
| 2015/0309149 A1* | 10/2015 | Holdsworth | A61B 6/466 324/309 |
| 2018/0156663 A1* | 6/2018 | Farley | G01J 3/462 |
| 2018/0204111 A1* | 7/2018 | Zadeh | G06V 10/764 |
| 2018/0364900 A1* | 12/2018 | Reynolds | G06F 16/9535 |
| 2018/0365861 A1* | 12/2018 | Reynolds | G06V 20/20 |
| 2019/0035125 A1 | 1/2019 | Bellows et al. | |
| 2019/0122404 A1 | 4/2019 | Freeman | |
| 2019/0172119 A1* | 6/2019 | Craft | G06Q 30/0631 |
| 2019/0180432 A1* | 6/2019 | Xin | G06V 10/56 |
| 2019/0340433 A1* | 11/2019 | Frank | G01C 21/3841 |
| 2020/0082542 A1* | 3/2020 | Zhu | G06T 7/11 |
| 2020/0111263 A1* | 4/2020 | Huang | G06Q 30/0643 |
| 2020/0258144 A1* | 8/2020 | Chaturvedi | G06Q 30/0633 |
| 2020/0302656 A1* | 9/2020 | Kumar | G06T 7/90 |
| 2020/0320713 A1* | 10/2020 | Furukawa | G06T 7/155 |
| 2021/0058533 A1* | 2/2021 | Aggarwal | G06V 10/56 |
| 2024/0303890 A1 | 9/2024 | Williams et al. | |

FOREIGN PATENT DOCUMENTS

| | | |
|---|---|---|
| EP | 3479344 A1 | 5/2019 |
| WO | 2017149315 A1 | 9/2017 |
| WO | 2018002533 A1 | 1/2018 |

OTHER PUBLICATIONS

Chen et al., "DeepLab: Semantic Image Segmentation with Deep Convolutional Nets, Atrous Convolution, and Fully Connected CRFs", arXiv:1606.00915v2, May 12, 2017, 14 pp.

He et al., "Deep Residual Learning for Image Recognition", arXiv:1512.03385v1 [cs.CV] Dec. 10, 2015, Dec. 10, 2015, 12 pp.

Krizhevsky et al., "ImageNet Classification with Deep Convolutional Neural Networks", Advances in Neural Information Processing Systems 25 (NIPS 2012), Dec. 3, 2012, 9 pp.

Simonyan et al., "Very Deep Convolutional Networks for Large-Scale Image Recognition", arXiv:1409.1556v6, Apr. 10, 2015, 14 pp.

Szegedy et al., "Going Deeper with Convolutions", 1 arXiv: 1409.4842v1, Sep. 17, 2014, 12 pp.

Zhou et al., "Scene Parsing through ADE20K Dataset", 2017 IEEE Conference on Computer Vision and Pattern Recognition (CVPR), Jul. 21, 2017, 9 pp.

\* cited by examiner

```
 1: <img class="image-natural" src="blob:http://localhost:8080/inputimage" alt="">
 2: <svg class="svg-defs-wrapper" x="0" y="0" width="100" height="100%" version="1.1"
    xmlns="http://www.w3.org/2000/svg" xmlns:xlink="http://www.w3.org/1999/xlink"
    viewBox="0 0 2400 1600">
 3: <defs>
 4: <filter id="filter_0" x="0" y="0" width="100%" height="100%"
    filterUnits="objectBoundingBox" primitiveUnits="objectBoundingBox" color-
    interpolation-filters="sRGB">
 5: <feFlood flood-color="#7dc1cb" result="selectedCoating"></feFlood>
 6: <feImage xlink:href="data:image/png;base64,iVB..." x="0" y="0" width="100%"
    height="100%" result="lightenedImg"></feImage>
 7: <feImage xlink:href="blob:http://localhost:8080/inputimage" x="0" y="0"
    width="100%" height="100%" result="roomImageZero"></feImage>
 8: <feComposite in="lightenedImage" in2="roomImageZero" operator="over" x="0%"
    y="0%" width="100%" height="100%" result="roomImage"></feComposite>
 9: <feComposite in="roomImageZero" in2="roomImageZero" operator="over" x="0%" y="0%"
    width="100%" height="100%" result="roomImage"></feComposite>
10: <feImage xlink:href="data:image/png;base64,iVBORw0KNSUhEUgAABL..." x="0" y="0"
    width="100%" height="100%" result="desaturationMask"></feImage>
11: <feColorMatrix in="roomImageZero" type="saturate" values="0"
    result="roomImage"></feColorMatrix>
12: <feComposite in="roomImage" in2="desaturationMask" operator="in" x="0%" y="0%"
    width="100%" height="100%" result="desatRoomParts"></feComposite>
13: <feComposite in="desatRoomParts" in2="roomImageZero" operator="over" x="0%"
    y="0%" width="100%" height="100%" result="roomImage"></feComposite>
``` cont'd in FIG. 18B...

FIG. 18A

...cont'd from FIG. 18A

```
14:        <feBlend mode="multiply" in="selectedCoating" in2="roomImage"
              result="roomImage"></feBlend>
15:      </filter>
16:      <mask id="mask_0" x="0" y="0" width="100%" height="100%"
              maskUnits="objectBoundingBox">
17:        <image x="0" y="0" width="100%" height="100%"
              xlink:href="http://localhost/static/files/objectmasks.png"> </image>
18:      </mask>
19:    </defs>
20:  </svg>
21:  <svg class="image-tinted" version="1.1" xmlns="http://www.w3.org/2000/svg"
          viewBox="0 0 2400 1600" preserveAspectRatio="none">
22:    <rect fill="rgba(0,0,0,0)" x="0" y="0" width="100%" height="100%"
              mask="url(#mask_0)" filter="url(#filter_0)"></rect>
22:  </svg>
```

FIG. 18B

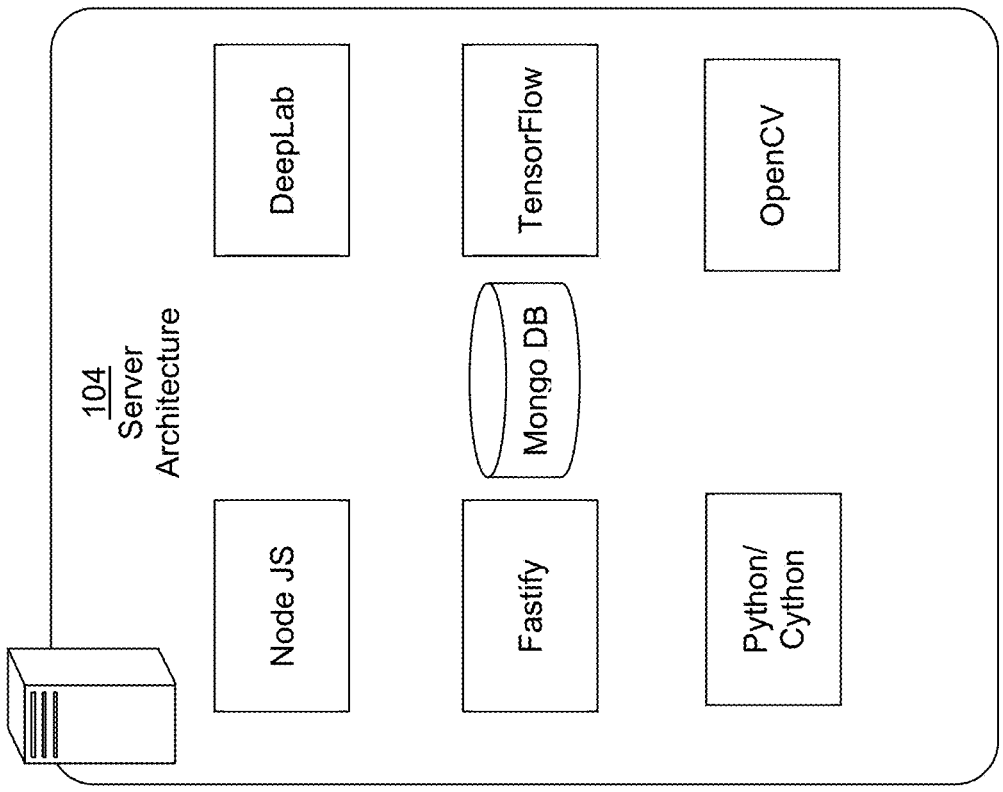
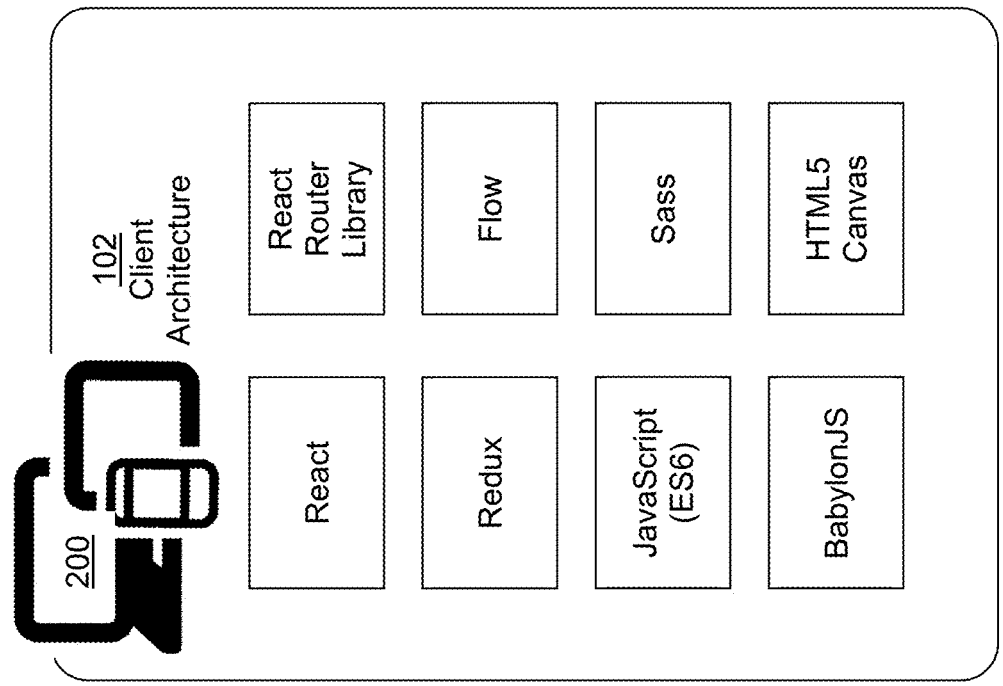
FIG. 20

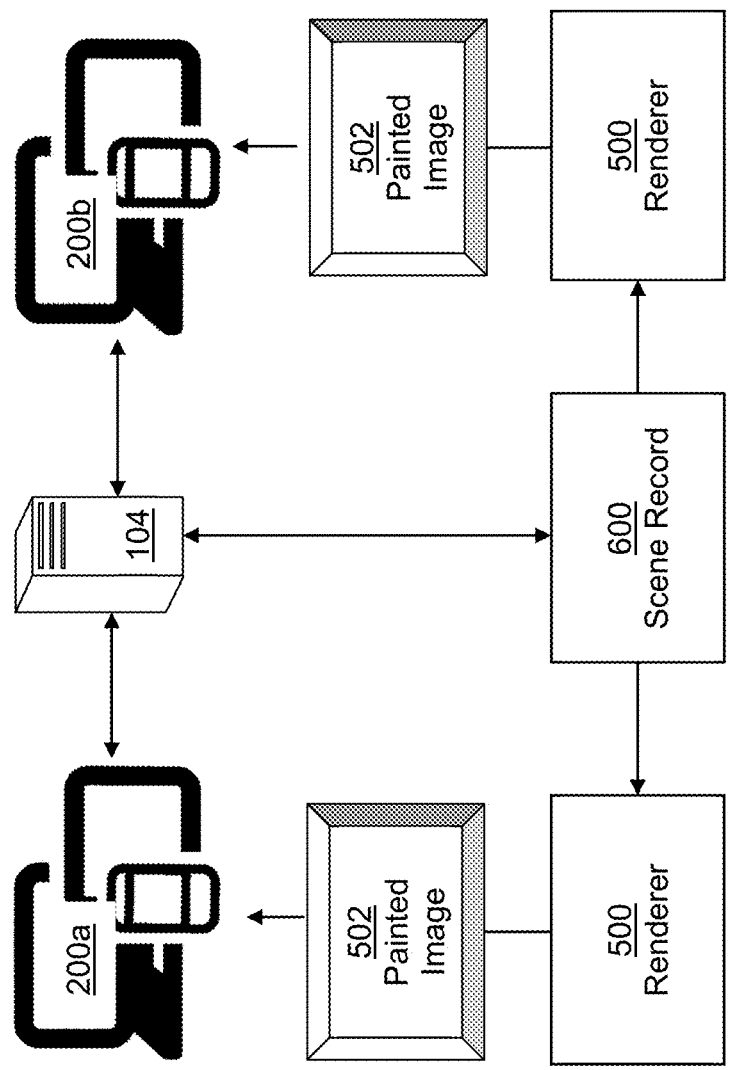

AUGMENTATION OF DIGITAL IMAGES WITH SIMULATED SURFACE COATINGS

CROSS-REFERENCE TO RELATED APPLICATIONS

The present application is a continuation-in-part of International Patent Application No. PCT/US2020/054939, filed on Oct. 9, 2020, which claims priority to U.S. Provisional Patent Application No. 62/914,087, filed on Oct. 11, 2019, the disclosures of which are incorporated by reference herein.

TECHNICAL FIELD

Embodiments of the present disclosure relate generally to the field of computer graphics, and more particularly to augmenting digital images to depict the simulated application of coatings.

BACKGROUND

Visual aids can assist purchasers in the selection of paints, stains, or other coatings for application to a surface. One form of visual aid are paint chips, or color swatches, in which the coating has been applied to a physical surface, that can provide a truer sense of what a coating looks like when applied. Such swatches are limited in that they are often small, and aren't applied to the entirety of a surface that the purchaser may wish to cover.

Computers and mobile devices provide the ability to modify digital images. For example, photo editing tools enable regions of pixels to be selected to be recolored, either by filling with a solid, opaque color, or by using one or more translucent overlays. In order to realistically portray how a coating might look on a given surface using a photo editing tool, a number of manual techniques are required to select the appropriate pixels and apply coloration while maintaining areas of shadow, highlight, or other factors that affect how a pixel of a surface should be colored.

The field of augmented reality has developed a number of techniques for automatically augmenting a displayed image to, for example, depict objects that don't exist in the physical scene, or to alter the appearance of existing objects with one or more overlays. Such systems often rely on edge detection or other techniques known in the art to identify regions of similar colors that can be assumed to make up a continuous surface. These systems often struggle to determine the pixel boundaries of objects or surfaces when one or more intervening objects partially block the view.

A need exists, therefore, for improved systems and methods to modify images to simulate the application of a coating to a surface depicted in a digital image.

SUMMARY

Embodiments of the present disclosure address the need for improved systems and methods to modify images to simulate the application of a coatings to a surface depicted in a digital image.

In one aspect of the present disclosure, a coating product selection system can comprise at least one memory and at least one processor configured to implement a mask generator configured to receive an input image, perform a search to detect a recognized object depicted in the input image and generate an image segment which may include pixels of the input image that depict the recognized object. A color analyzer can be configured to determine one or more dominant colors of the recognized object from the image segment and determine at least one recommended coating product, the at least one recommended coating product having a color selected to coordinate with at least one of the one or more dominant colors. A user interface can be configured to present the at least one recommended coating product on a display and receive a user selection of a selected coating product.

In embodiments, the mask generator comprises a classification model trained to identify a room type of the input image. The at least one recommended coating product can have a product type selected based on the identified room type. In embodiments, the classification model is trained to identify room types selected from the group consisting of: kitchen, living room, dining room, bedroom, bathroom, laundry room, mud room, office, nursery, and recreation room.

In embodiments, the search to identify a recognized object is performed by providing the input image to an image segmentation model trained to identify pixels corresponding to at least one class of focus objects.

In embodiments, the mask generator is configured to detect a plurality of recognized objects, and the color analyzer is configured to determine the dominant colors from the plurality of recognized objects.

In embodiments, the color analyzer is configured to determine the dominant colors from a subset of the plurality of recognized objects. The one or more dominant colors are determined based on colors within a pre-existing color library stored in the memory.

In embodiments, each of the at least one recommended coating products has a color corresponding to a color within a pre-existing color library stored in the memory.

In embodiments, the mask generator is configured to detect a plurality of paintable recognized objects and generate plurality of paintable image segments, each paintable image segment comprising pixels of the input image that depict a corresponding paintable recognized object of the plurality of paintable recognized objects. The user interface is configured to receive a user selection of at least one coating assignment, each coating assignment comprising a selected coating product and a selected paintable image segment corresponding to a paintable image segment of the plurality of paintable recognized objects. The system can further comprise a renderer configured to generate a painted image, each pixel of the painted image having a painted color determined to be the same color as the corresponding pixel of the input image if the pixel is not within a paintable image segment of at least one of the at least one coating assignments and determined based on the selected coating product of a coating assignment of the at least one coating assignments if the corresponding pixel of the input image is within the paintable image segment of the coating assignment.

In embodiments, the mask generator is configured to detect the plurality of paintable image segments by providing the input image to an image segmentation model trained to identify classes of surfaces which can be selected from the group consisting of wall surfaces, ceiling surfaces, and trim surfaces.

In one aspect of the present disclosure, a computer-implemented method for selecting and displaying a coating product comprises receiving an input image, performing a search to detect a recognized object depicted in the input image, generating an image segment comprising pixels of the input image that depict the recognized object, determining one or more dominant colors of the recognized object from the image segment, determining at least one recommended coating product, the at least one recommended coating product having a color selected to coordinate with at least one of the one or more dominant colors, and presenting a user interface comprising an output displaying the at least one recommended coating product and an input control for receiving a user selection of a selected coating product.

In one aspect of the present disclosure, a system for displaying a visualization of a scene depicted in an input image comprises at least one memory and at least one processor configured to implement a scene record for storing a plurality of data elements defining a scene to be visualized, the data elements. The scene record can comprise an input image, at least one image segment, each image segment of the at least one image segment comprising pixels of the input image corresponding to a recognized object, at least one coating assignment, each coating assignment of the at least one coating assignments comprising a selection of a recognized object and a selection of a coating product.

The system can further comprise a scene visualizer client comprising a renderer configured to generate a painted image based on the scene record, each pixel of the painted image having a painted color determined to be the same color as the corresponding pixel of the input image if the pixel is not within a paintable image segment of at least one of the at least one coating assignments and determined based on the selected coating product of a coating assignment of the at least one coating assignments if the corresponding pixel of the input image is within the paintable image segment of the coating assignment.

In an embodiment, the scene record further includes an identifier and the system includes a server comprising a data store for storage of the scene record and configured to provide access to the scene record to one or more scene visualizer clients in response to a request including the identifier. The identifier can be a globally unique uniform resource identifier (URI) or uniform resource locator (URL). In an embodiment, the scene visualizer client is provided on a web page accessible via the URL.

In an embodiment the server further comprises a mask generator configured generate an image segment by performing a search to detect a recognized object depicted in the input image and storing an image segment comprising pixels of the input image that depict the recognized object in the scene record and a color analyzer configured to determine one or more dominant colors of the recognized object from the image segment, determine at least one recommended coating product, the at least one recommended coating product having a color selected to coordinate with at least one of the one or more dominant colors, and store the one or more dominant colors and the at least one recommended coating product in the scene record.

In an embodiment, the server is configured to inform the scene visualizer client of updates to the scene record, and the renderer is configured to update the painted image based on the updated scene record.

In an embodiment, the scene visualizer client includes a shareable link such that a second scene visualizer client can simultaneously access the scene record.

In one aspect of the present embodiment, a method for displaying a visualization of a scene depicted in an input image comprises storing, in a memory of a server, a scene record containing a plurality of data elements defining a scene to be visualized. The data elements can include: an identifier, an input image, at least one image segment, each image segment comprising pixels of the input image corresponding to a recognized object, and at least one coating assignment, each coating assignment of the at least one coating assignments comprising a selection of a recognized object and a selection of a coating product.

The method can further comprise providing a scene visualizer client configured to request the scene record from the server based on the identifier, and generate a painted image based on the scene record. Each pixel of the painted image can have a painted color determined to be the same color as the corresponding pixel of the input image if the pixel is not within a paintable image segment of at least one of the at least one coating assignments and determined based on the selected coating product of a coating assignment of the at least one coating assignments if the corresponding pixel of the input image is within the paintable image segment of the coating assignment. The scene visualizer client can display the painted image on a user interface.

In an embodiment, the method can further comprise, in response to an update to the scene record, generating an image segment by performing a search to detect a recognized object depicted in the input image and storing an image segment comprising pixels of the input image that depict the recognized object in the scene record, and determining one or more dominant colors of the recognized object from the image segment, determine at least one recommended coating product, the at least one recommended coating product having a color selected to coordinate with at least one of the one or more dominant colors, and store the one or more dominant colors and the at least one recommended coating product in the scene record. The server can inform the scene visualizer client of updates to the scene record the scene visualizer client can update the painted image based on the updated scene record.

In an embodiment, the method can comprise a second scene visualizer client requesting the scene record and generating a second painted image and displaying the second painted image on a second user interface.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

BRIEF DESCRIPTION OF THE DRAWINGS

Subject matter hereof may be more completely understood in consideration of the following detailed description of various embodiments in connection with the accompanying figures.

FIG. 18A is a code listing depicting a partial HTML document, according to an embodiment.

FIG. 18B is a code listing depicting a partial HTML document, according to an embodiment.

FIG. 20 is a schematic diagram depicting architectural elements of an image augmentation system, according to an embodiment.

FIG. 21 is a schematic diagram depicting architectural elements of a shared scene visualizer, according to an embodiment.

Figure 1:
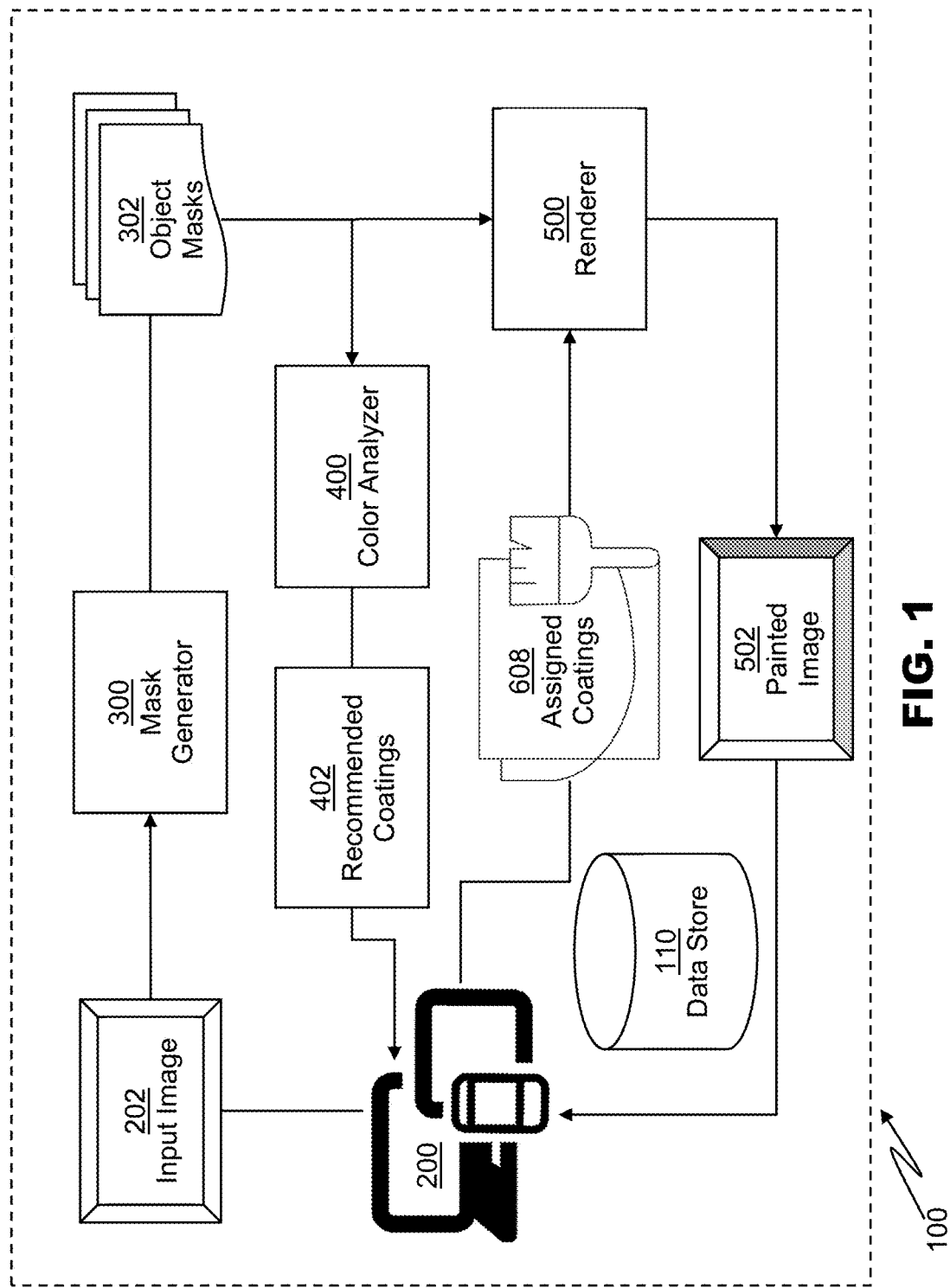
FIG. 1 is a schematic diagram depicting an image augmentation system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 depicts a system 100 for augmenting an input image to depict a simulated coating applied to a surface in the input image. System 100 can comprise one or more computing devices 10, data store 110, user interface 200, mask generator 300, color analyzer 400, and renderer 500.

Figure 2:
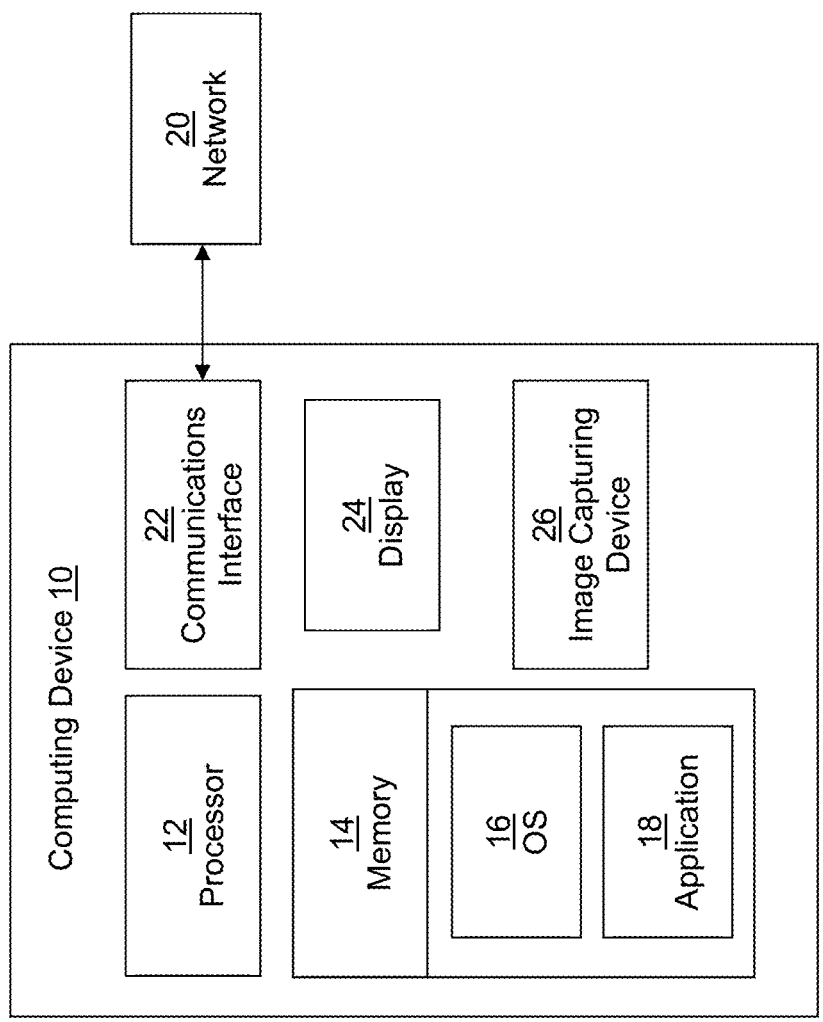
FIG. 2 is a schematic diagram depicting various components of an example computing device, according to an embodiment.

FIG. 2 is a block diagram depicting various components of an example computing device 10, as may be used in embodiments. Each computing device 10 can execute one or more components of system 100. Computing device 10 can be a stationary, mobile, or handheld computing device such as a desktop computer, server, mainframe, a tablet or notebook computer, mobile communications device (e.g., smartphone), or the like.

Computing device 10 can include processor 12 communicatively coupled to a memory 14 storing computer executable instructions that are readable and executable by processor 12. Memory 14 can include both transitory and non-transitory components. Such instructions can include an operating system 16 for the computing device 10, and one or more applications 18. However, it is to be appreciated that some or all of the instructions or associated data can be stored remotely from the computing device 20 for access over a network 20 if desired, and that the instructions and associated data need not be stored locally within the memory 14.

Communications interface 22 can comprise one or more network connections enabling communicative coupling between the various components of system 100 via one or more networks 20. Network connections can include network adaptors (e.g., a modem, a network card (wireless or wired), an infra-red communication device, fiber optic communication device, etc.) and facilitate the communication of data, information, and/or any content electronically between network-connected devices over the communication network. Example communications include both wired and wireless communications, such as Wi-Fi communications, communications via a cellular telephone system, BLUETOOTH communications, near field communications, and the like.

One or more computing devices 10 can execute user interface 200 which can comprise a mobile application, web-based application, or any other executable application framework. User interface 200 can reside on, be presented on, or be accessed by any computing devices capable of communicating with the various components of system 100, receiving user input, and presenting output to the user. Computing devices 10 executing user interface 200 can further include input and output devices including display 24 and image capturing device 26. Image capturing device 26 can be a camera, scanner, or other device used to capture color images or images having identifying indicia for paint colors (for example, from paint chips).

Referring again to FIG. 1, data store 110 can comprise databases, file systems, memories, or other storage systems appropriate to store and provide the described data items. Data store 110 can reside within a single computing device 10 or be distributed across one or more communicably couplable computing devices 10. Data stores described herein can reside within a single database system or across a plurality of database systems. Database systems used in implementations can include Apache Hadoop, Hadoop Distributed File System (HDFS), Microsoft SQL Server, Oracle, Apache Cassandra, MySQL, MongoDB, MariaDB or the like. Each data store can be physically or logically separated from each other data store, such that individual data stores can reside on computing devices or networks that are decoupled from other data stores.

Each data store can comprise logical groupings of data. Numerous types and structures of data, can be stored, and indexed. Where, as depicted or described, data structures are said to include or be associated with other data structures, it should be understood that such other data structures may be stored within or in association with each data structure or may be referenced by other data structures through the use of links, pointers, or addresses, or other forms of referencing data. All or portions of data store 110 can be present in the memory of one of more computing devices of system 100, or accessible via network connections between computing devices of system 100.

FIGS. 3A-3F depict example screens that can be provided by user interface 200 to present output to, and receive input from, a user according to an embodiment. Each screen of user interface 200 can present controls or other interfaces enabling the user to request one or more actions from system 100. The operation of system 100 with respect to the screens depicted in FIGS. 3A-3F is provided in further detail herein.

While FIGS. 3A-3F are depicted, embodiments of system 100 can provide more, fewer, or alternative screens.

Figure 3A:
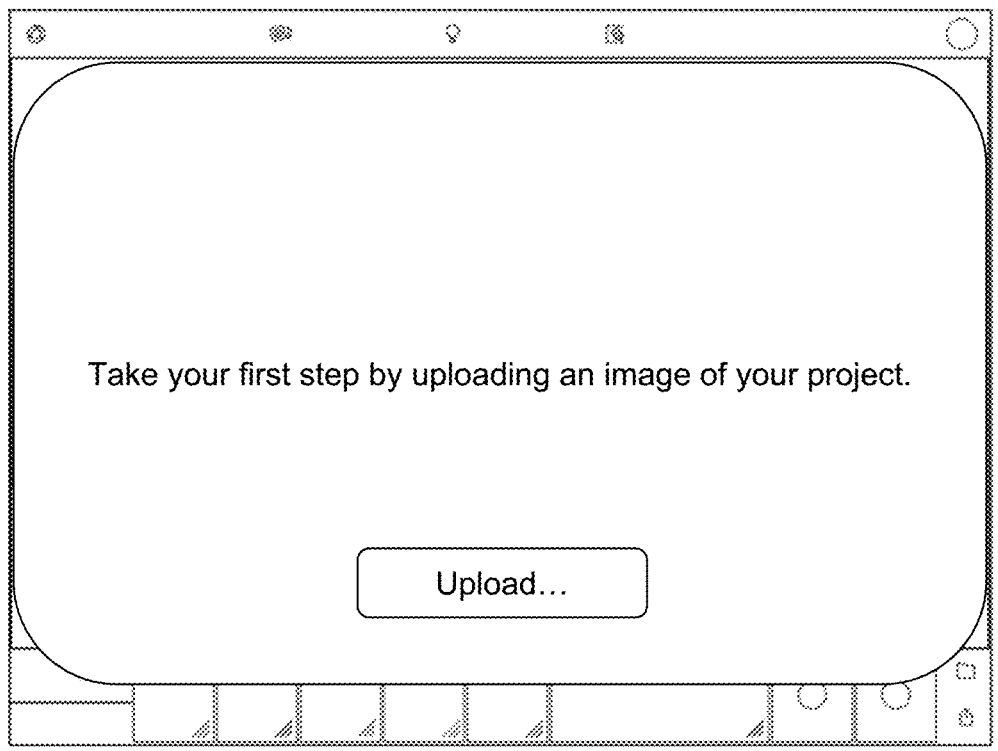
FIGS. 3A-3F are mockups depicting example user interface screens of an image augmentation application, according to an embodiment.
Figure 3B:
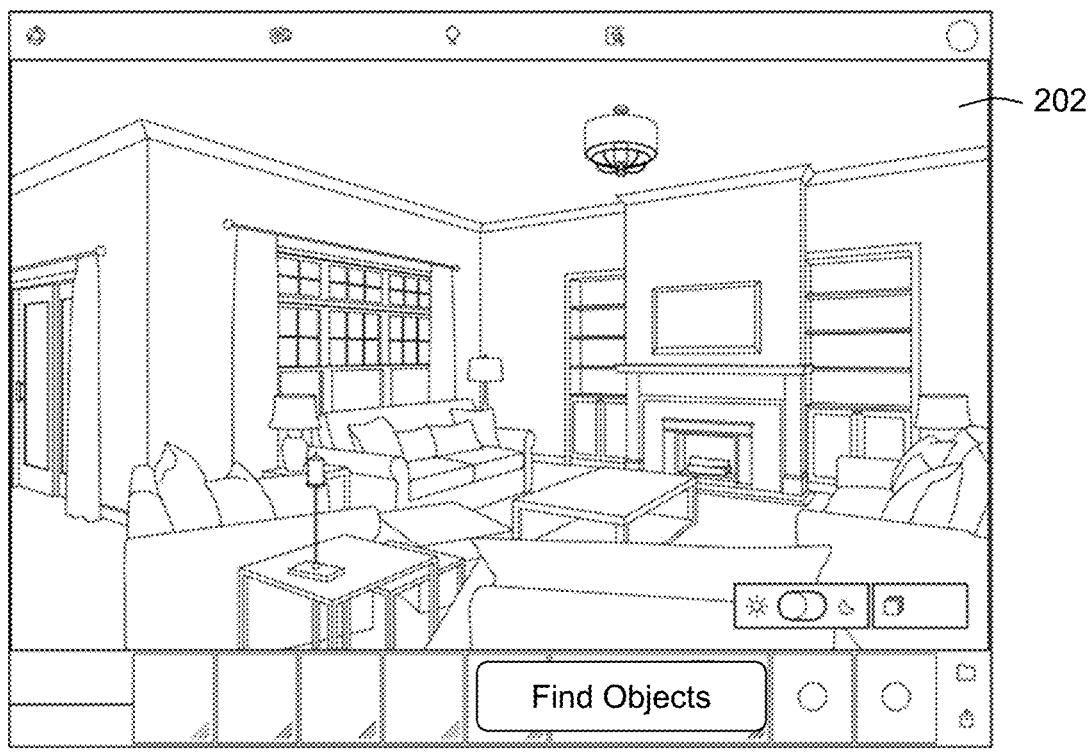

As depicted in FIG. 3A, the user can be prompted to select or upload an original, or input, image 202 from a memory. User interface 200 can further enable the user to control an image capture device 26 such as a camera connected or integrated into a computing device to capture an image on demand. As depicted in FIG. 3B, input image 202 can be displayed, and the user can be prompted to request that objects be automatically recognized. In alternative embodiments, object recognition can begin without waiting for user input.

Figure 3C:
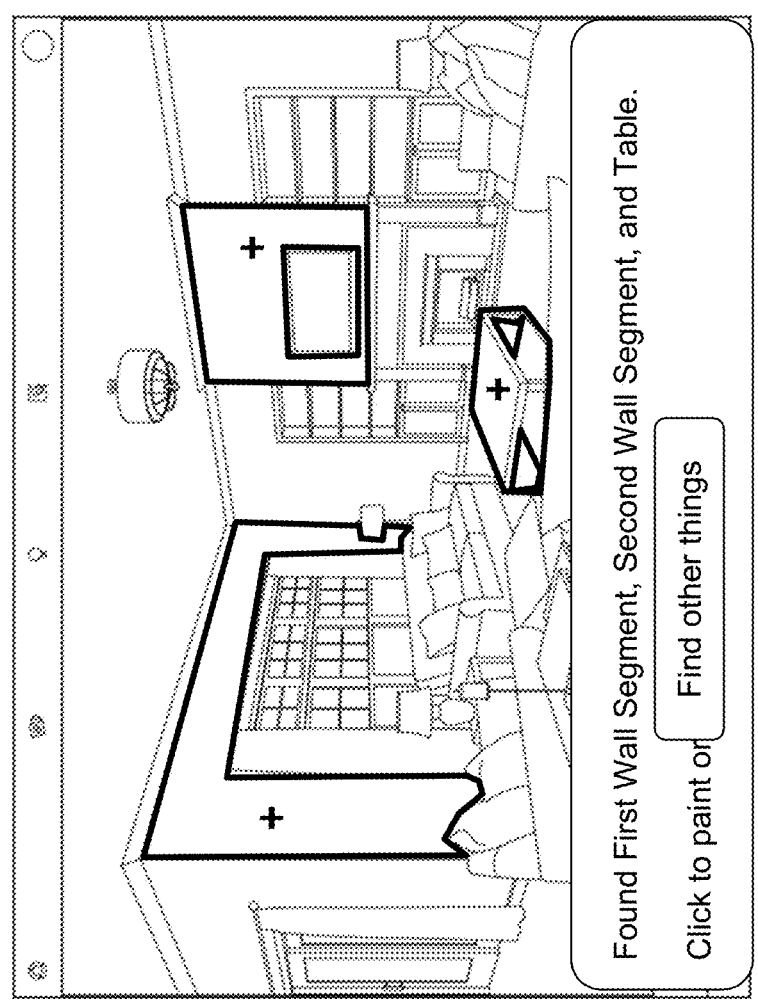
Figure 3D:
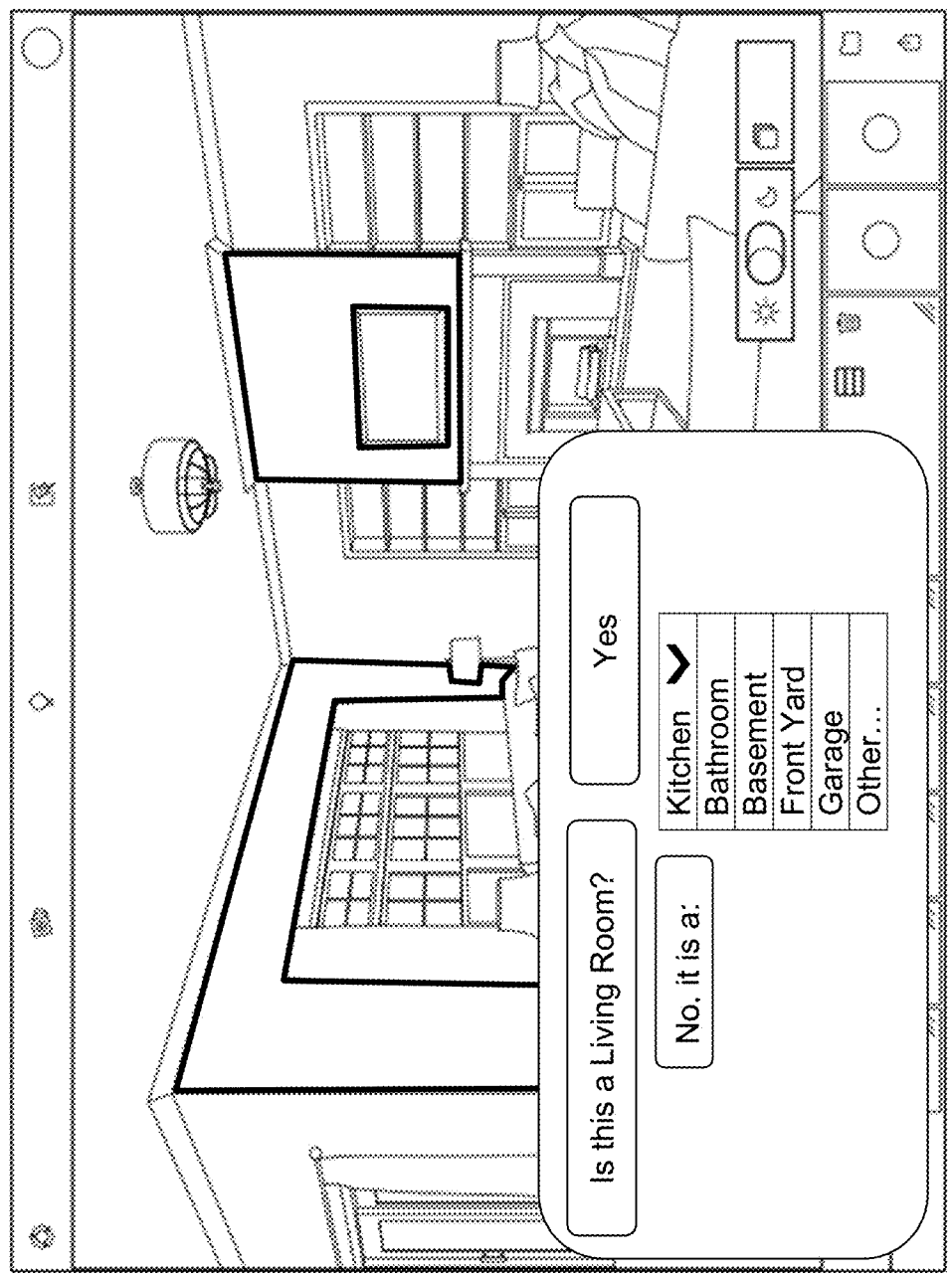
Figure 3E:
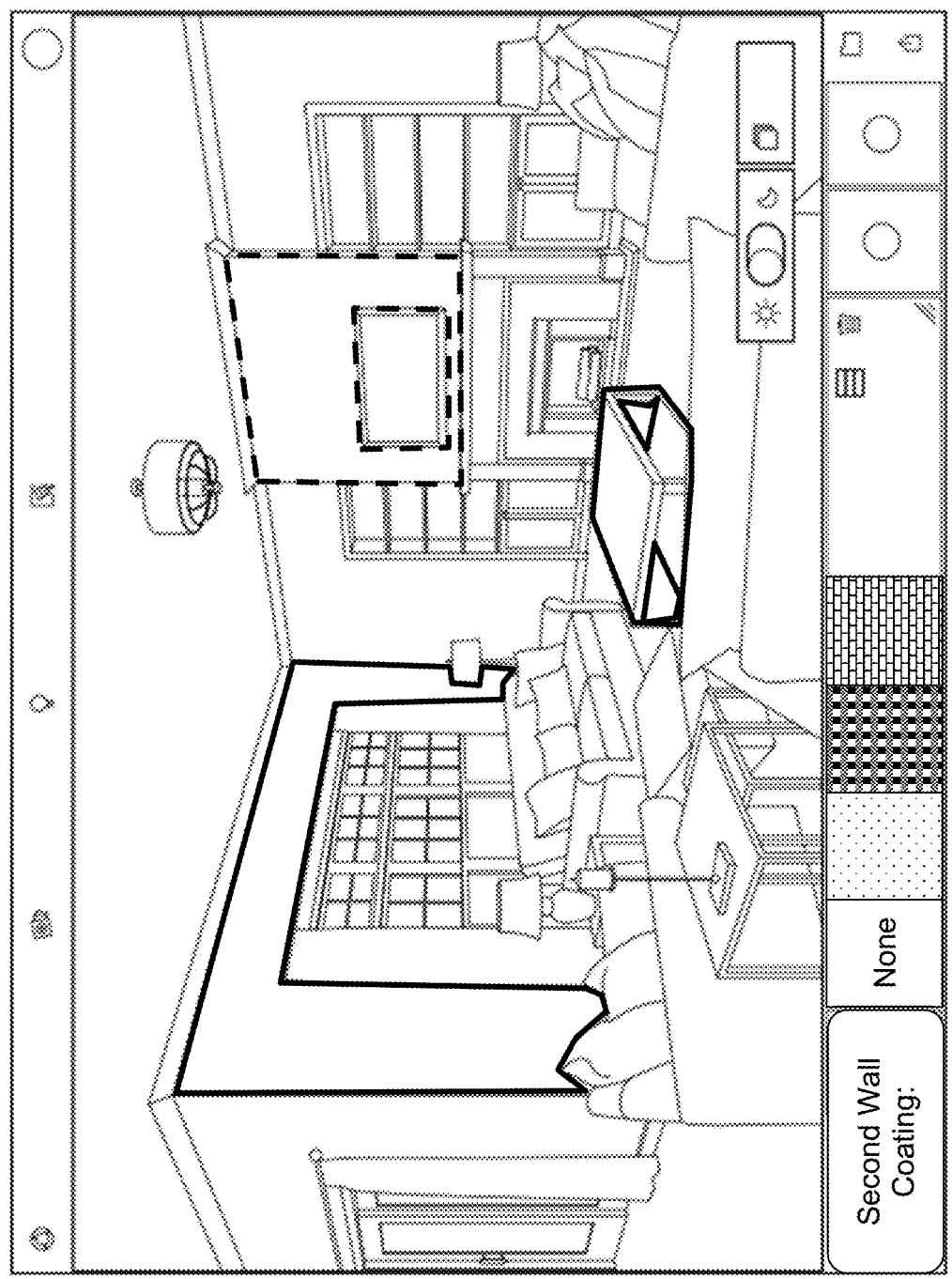
Figure 3F:
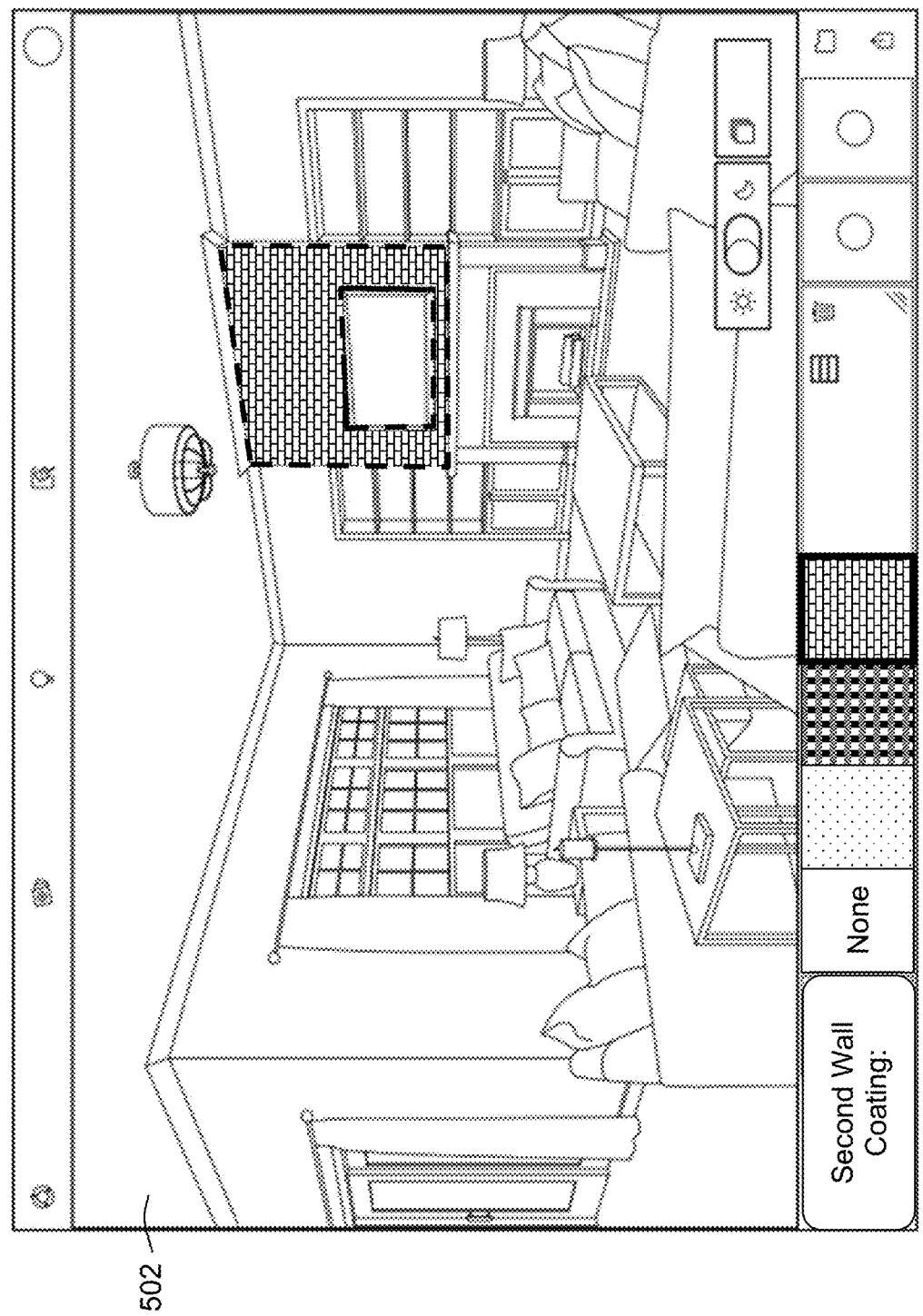

As depicted in FIG. 3C, a screen can be provided that identifies objects recognized in input image 202 and requests user feedback. If the user does not want to click one of the recognized objects, a screen such as that depicted in FIG. 3D can request confirmation that depicted scene is correctly identified. FIG. 3E depicts an example screen enabling the user to choose a assigned coating 608 for application on a recognized objected. FIG. 3F depicts an example screen depicting painted image 502, which has been modified to depict the selected coating.

Referring again to FIG. 1, input image 202 can comprise a digital image in any image file format known in the art, such as bitmap (BMP), raw, graphics interchange format (GIF), joint photographic experts group (JPEG, or JPG), portable network graphics (PNG), or the like. Input image 202 can further comprise a single frame or image from a sequences of images such as animated GIF files, or video formats such as moving picture experts group (MPEG, or MP4), audio video interleave (AVI), or the like. Input image 202 can further comprise streaming image data. While input image 202 and other image data described herein can include vector graphical data, or polygonal mesh data, the data structure of input image 202 and other images will be described, conceptually, herein as a two-dimensional array of pixels (i.e., raster data).

Pixels within an image file can each comprise one or more parameters defining the visual appearance of the pixel when output to a display, a printer, or other image viewer. Pixel parameters can comprise color information in red/green/blue (RGB), hue/saturation/value (HSV), cyan/magenta/yellow/black (CMYK), or other computer-comprisable color definition formats, as well as transparency parameters such as an alpha value.

Figure 4:
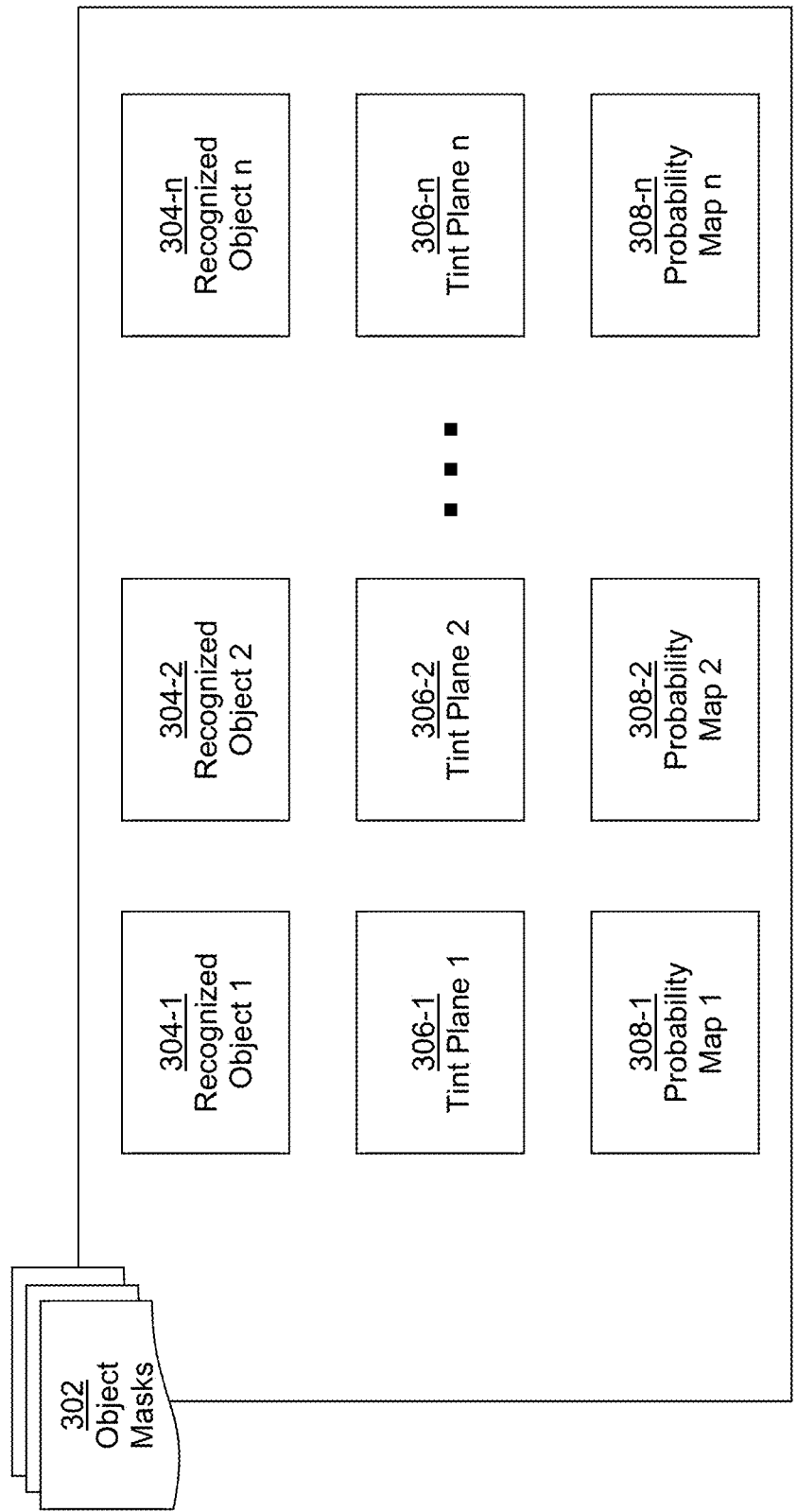
FIG. 4 is a schematic diagram depicting object masks, according to an embodiment.

Mask generator 300 can receive input image 202 and generate one or more object masks 302. As depicted in FIG. 4, each object mask 302 can be associated with a recognized object 304, and include a tint plane mask image 306 (or simply, tint plane 306) and a probability map 308. Tint plane 306 is also referred to as an image segment or image segmentation herein. Certain objects masks 302 can define the pixels of input image 202 that depict a paintable, or tintable surface within input image 202. Each recognized object 304 can be an entire object (such as a sofa), or an individual surface of an object (such as the top of a table).

Figure 5:
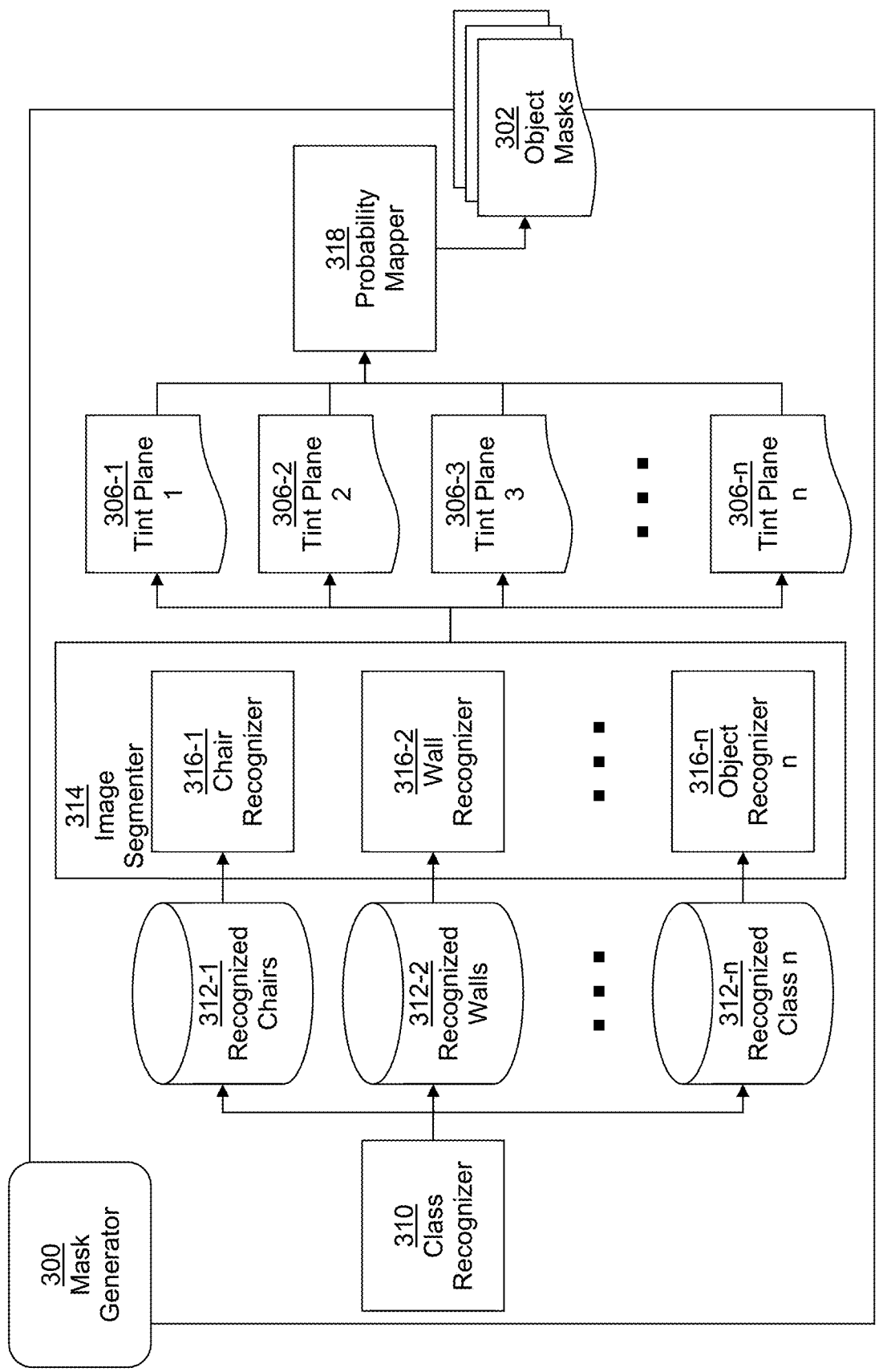
FIG. 5 is a schematic diagram depicting components of a mask generator, according to an embodiment.

FIG. 5 is a schematic view depicting components of mask generator 300. Class recognizer 310 can comprise a classifier that has been trained to identify areas of an image that depict an object in one or more classes of common objects. In embodiments, class recognizer 310 can be trained to identify classes of objects such as interior and exterior architectural surfaces, including walls, floors, ceilings, and wall/ceiling trim and molding; architectural scenes, such as living room, kitchen, bedroom, bathroom, entryway, office, recreation room, garage, front exterior, and rear exterior; kitchen and bathroom cabinets of various types; common forms of furniture, including tables of various types, chairs of various types, desks, armoires, wardrobes, sideboards, bookcases, benches, entertainment centers, consoles, and chests of drawers, and the like.

In embodiments, multiple class recognizers 310 can be provided. A room classification model can determine room type depicted in input image 202. The determined room type, such as kitchen, bathroom, living room, etc., can be used to recommend the best-suited colors, products, and sheens for that room type. A paintable surface model can be an image segmentation model trained to recognize for walls, ceilings, and trim, or other paintable surfaces. A focus object model can be a image segmentation model with classes for multiple room objects of interest, such as couch, chair, chest of drawers, drapery, rug, cabinet, painting, sideboard, etc. The segmented images corresponding to recognized objects returned by the focus object model can be used to generate object masks, which can be used to determine recommended coatings that may complement the dominant colors of the recognized objects of interest. Each of the various class recognizers can be semantic, instance, or panoptic segmentation models.

Each class recognizer 310 can return a recognized class 312 data structure for each object class detected in the original image. Each recognized class 312 can comprise an identifier of the class, and, in embodiments, coordinates locating where the class was identified within the image. The coordinates can be pixel coordinates defining a bounding box. For example, a tuple of (x, y, width, height) can represent the x and y coordinates for the top left corner of a bounding box, and the width and height can define the extent of the bounding box. The coordinates can also be a more detailed representation of the perimeter of the area where the object class was recognized. In other embodiments, the identifier of the class can be provided without additional coordinate or location information.

In embodiments, class recognizer 310 can also deduce one or more insights regarding the depicted scene, for example, class recognizer 310 may determine that an input image that includes objects of certain classes (for example a sink, a refrigerator, and a dishwasher), that the scene depicts a kitchen. In another example, if a driveway object, a front door object, and one or more window objects are detected, class recognizer 310 may determine that an outdoor view of the front of a house is depicted. In embodiments, the type of scene can be used to narrow the potential classes searched for recognized objects. For example, if a region of the image is recognized as both a "bed" and a "sofa," but other classes within the image indicate that the scene depicts a bedroom, the recognized class 312 indicating that a region depicts a bed may be given additional weight.

Image segmenter 314 can comprise a plurality of object classifiers 316 each trained to identify the boundaries of objects of a particular class. For example, image segmenter 314 can comprise an interior wall recognizer, a sofa recognizer, an entertainment center recognizer, and/or the like. Image segmenter 314 can receive each recognized class 312 and generate a tint plane mask image 306 for each recognized object 304. If more than one recognized object 304 is found, the tint plane mask image 306 can be created in a predetermined order of priority (for examples, walls, followed by ceilings, followed by trim, followed by furniture, etc.). Each object classifier 316 can search the coordinate space identified by recognized class 312 for an object of the associated type without having to search the entire image. Because class recognizer 310 can operate at a less detailed level before object classifiers 316 perform more precise identification and location of objects, mask generator 300 can have improved efficiency and accuracy compared to systems that are trained only to recognize specific objects across an entire image.

Each of class recognizer 310 and the plurality of recognizers of image segmenter 314 can comprise a neural network, or other deep learning network such as a based on a deep learning network such as a convolutional neural network (CNN). Each neural network can be implemented as a TensorFlow model and can comprise a neural network with an architecture based on or similar to ResNet, AlexNet, GoogLeNet, DeepLab, VGG, or other neural network architecture. TensorFlow is an open source machine learning library published by Google, LLC. ResNet is a residual learning framework described by Kaiming He et al., *Deep Residual Learning for Image Recognition*, ARXIV: 1512.03385 (2015). AlexNet is a convolutional neural network framework described by Alex Krizhevsky et al., *ImageNet Classification with Deep Convolutional Neural Networks*, 25 ADVANCES IN NEURAL INFORMATION PROCESSING SYSTEMS 1097 (2012). GoogLeNet is a convolutional neural network architecture described by Szegedy et al., *Going Deeper with Convolutions*, ARXIV:1409.4842 (2015). DeepLab is a convolutional neural network framework described by Liang-Chieh Chen et al., *DeepLab: Semantic Image Segmentation with Deep Convolutional Nets, Atrous Convolution, and Fully Connected CRFs*, ARXIV:1606.00915 (2016). VGG is a convolutional neural network framework described by Karen Simonyan et al., *Very Deep Convolutional Networks for Large-Scale Image Recognition*, ARXIV: 1409.1556 (2014).

Each neural network can be trained using a plurality of labeled training images, and supervised and unsupervised neural network training techniques can be used. For example, deeply annotated training images from the publicly available ADE20K dataset can be used in addition to proprietary training data. The ADE20K dataset is published by the Massachusetts Institute of Technology, and described by Bolei Zhou, et al., *Scene Parsing through ADE20K Dataset*, PROCEEDINGS OF THE IEEE CONFERENCE ON COMPUTER VISION AND PATTERN RECOGNITION, 2017. Training images can be annotated to include labels identifying of parts of objects as well as whole objects.

Probability mapper 318 can receive each tint plane mask image 306 and a generate probability map 308 for each recognized object 304. Probability map 308 can comprise image data and each pixel in the probability map 308 can correspond to a pixel in input image 202. Probability map 308 can be represented in memory as a one-dimensional array, with every pixel of the source image represented with a single integer value 0-99. Pixels in probability map 308 can be ordered in the same way that image data is returned from an image processing API, such as the hypertext markup language 5 (HTML5) Canvas API's getImageData method—right to left and top to bottom, wrapping from the end of each image pixel row to the beginning of the next image pixel row. Probability map 308 can be defined by probability mapper 318, and updated and refined by other components of system 100.

At least one parameter of each probability map pixel (for example, red, green, blue, alpha, or other parameters) can have a probability value based on the confidence that the pixel in the input image is part of the associated recognized object 304. For example, the alpha (or transparency) value for each pixel can have a value of one hundred for pixels that are part of the interior of a recognized object, 1-99 for pixels that are part of an anti-aliased edge of the recognized object, and zero for pixels that are not part of the recognized object.

Embodiments of mask generator 300 can correctly identify up to 95% of the pixels that comprise a paintable surface of a depicted object that is represented by at least 1,000 pixels in the input image 202. The number of false positives (pixels incorrectly identified as being part of a paintable surface) can be fewer than 5% of the total number of pixels that actually comprise the surface.

Figure 6:
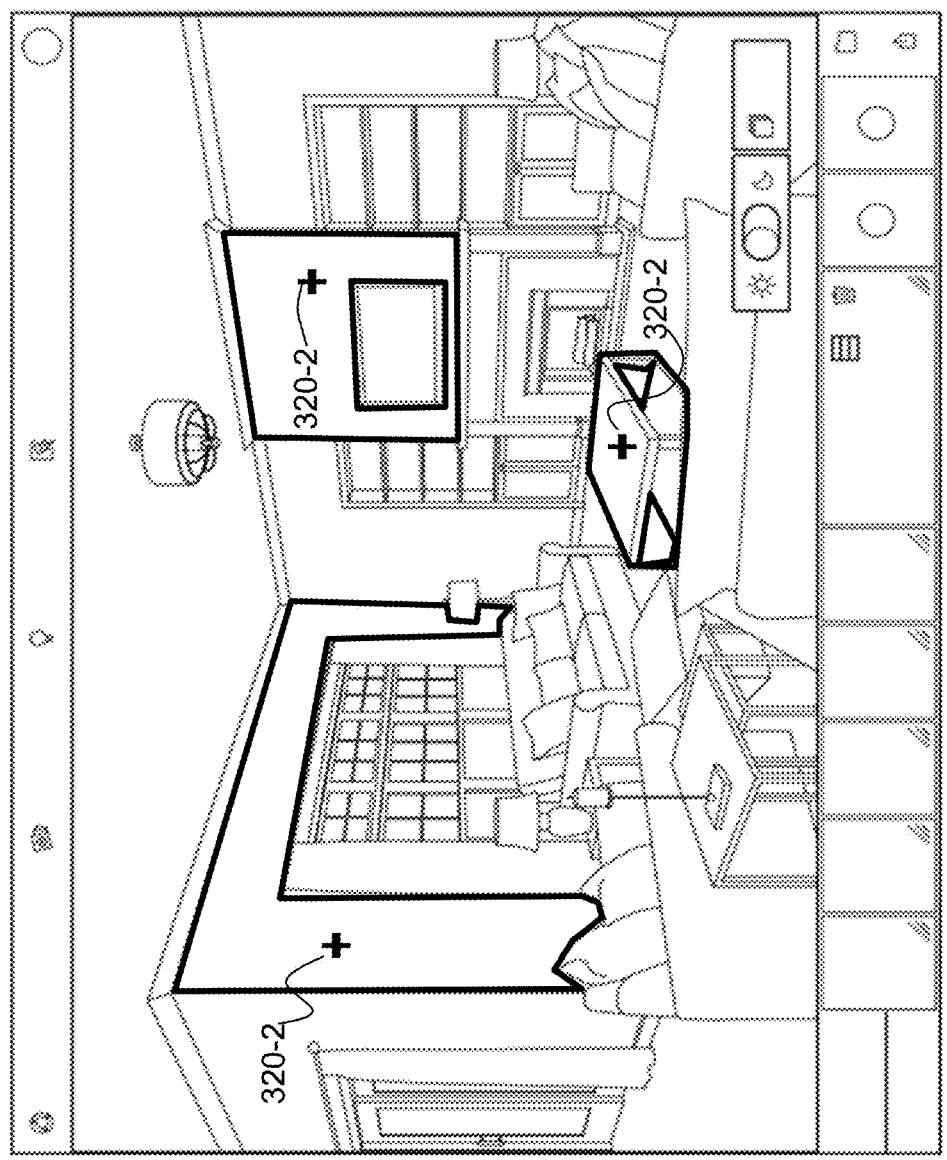
FIG. 6 is a mockup depicting an example user interface screen, according to an embodiment.

In embodiments, mask generator 300 can receive confirmation from the user at one or more phases of the mask generation process. For example, in one embodiment, mask generator 300 can present the tint planes 306 of the recognized objects 304 to the user by updating the display provided by user interface 200 to display the input image overlaid with graphical elements indicating recognized objects. The boundaries of one or more recognized objects 304 can be presented in a bold or highlighted manner, as depicted in FIG. 6. Further, the user can be presented with object selection controls 320 enabling the user to highlight or identify one or more recognized objects of interest.

As depicted in FIG. 6, object selection control 320-1 is associated with a first wall segment, object selection control 320-2 is associated with a second wall segment, and 320-3 is associated with a coffee table. Each object selection control 320 can enable the use to select the associated recognized object. While mask generator 300 can recognize any number of objects that are depicted in input image 202, only three recognized objects are highlighted in the depiction of FIG. 6 for clarity. User interface 200 can highlight all recognized objects within input image 202, and/or can enable the user to filter based on one or more criteria, such as the size of the recognized object, the type of the recognized object, or whether the recognized object has had a simulated coating applied during the current (or previous) session. Mask generator 300 can wait until receiving user confirmation before the execution of probability mapper 318.

Figure 7:
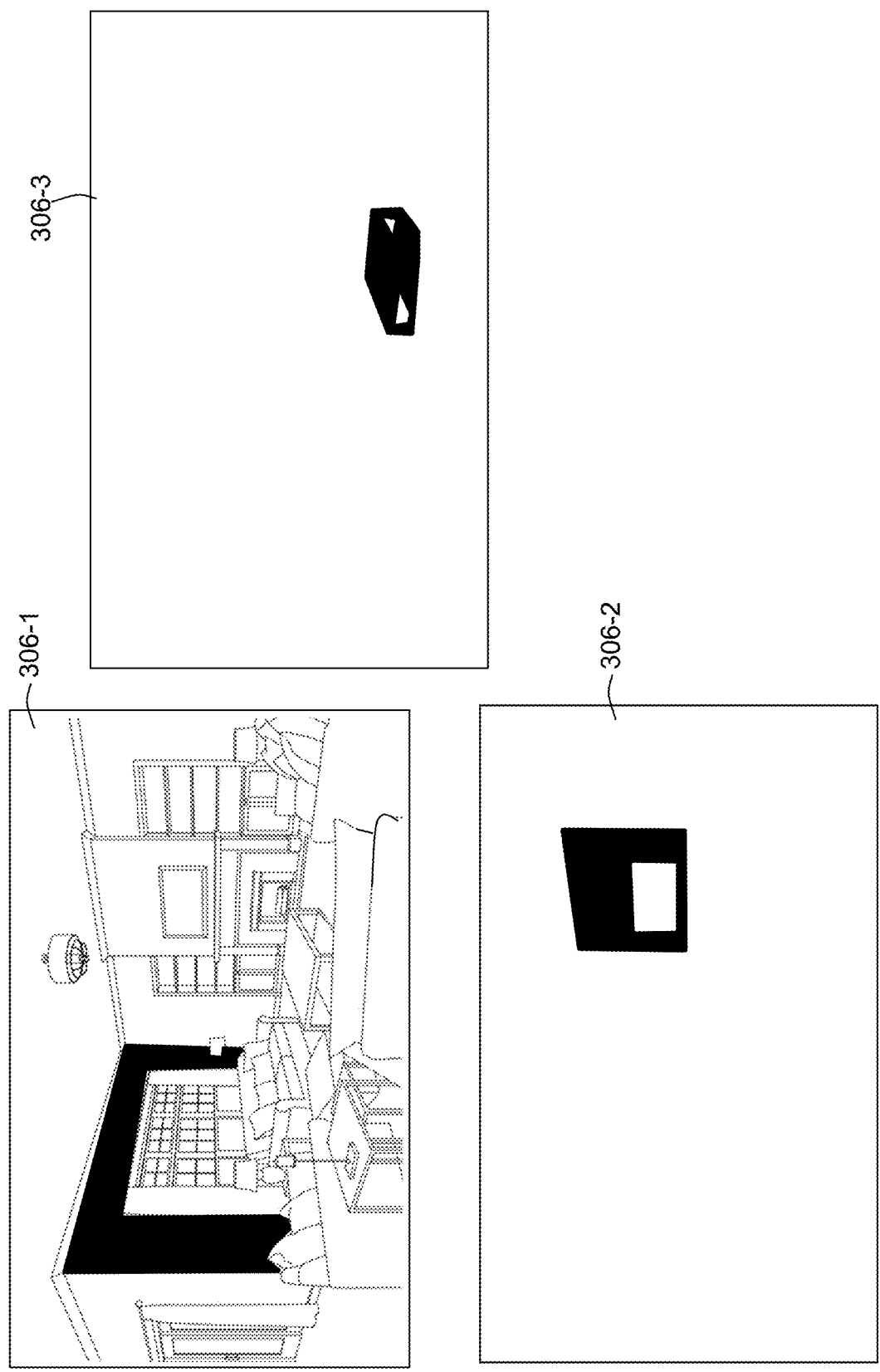
FIG. 7 is a mockup depicting tint plane mask images, according to an embodiment.

FIG. 7 depicts a representation of tint plane mask images 306-1, 306-2, and 306-3 that are associated with the recognized objects depicted in FIG. 6, with input image 202 depicted in juxtaposition with tint plane mask image 306-1.

Figure 8:
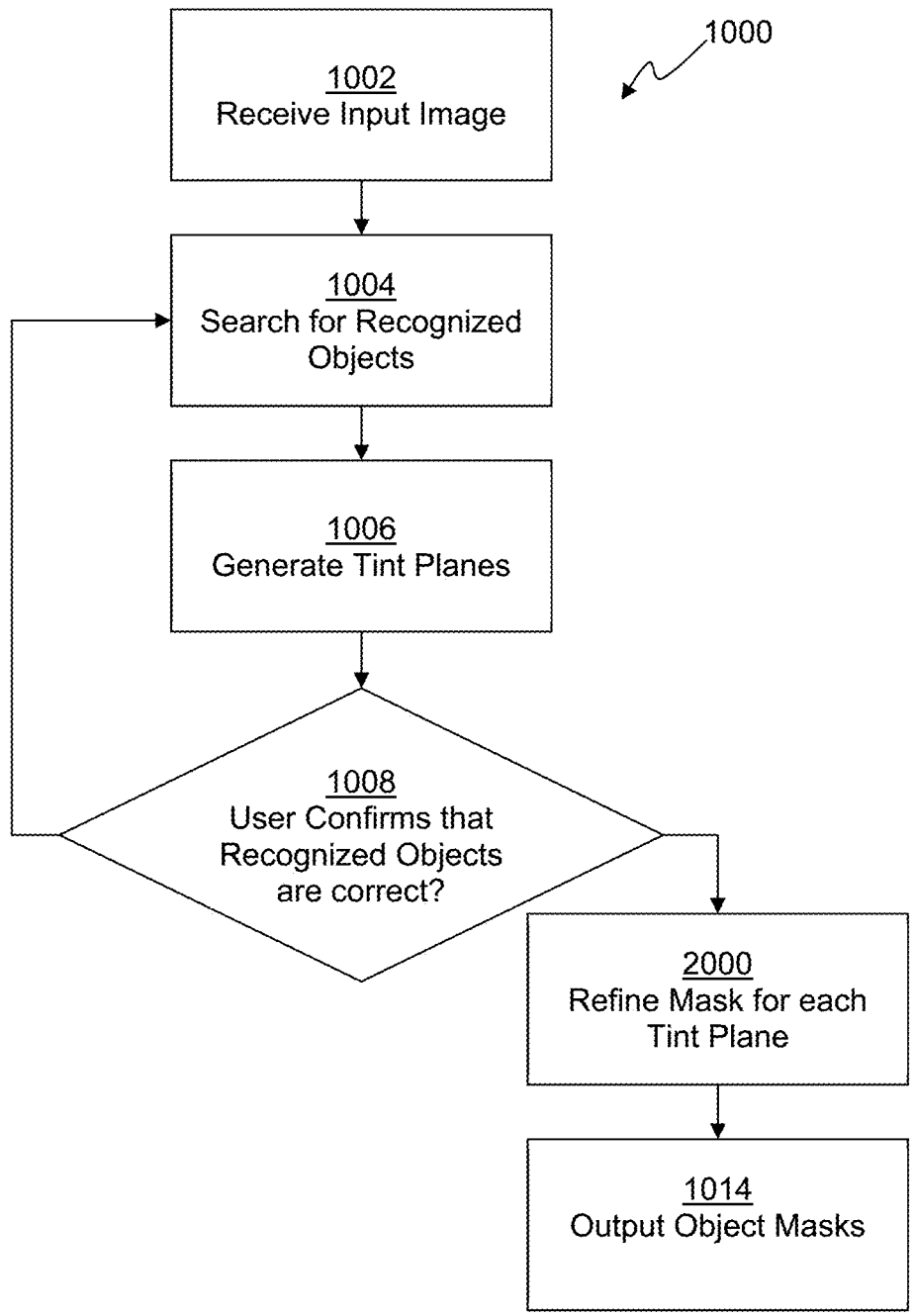
FIG. 8 is a flowchart depicting a method for generating object masks, according to an embodiment.

FIG. 8 is a flowchart depicting a method 1000 that can be executed to create object masks 302 based on input image 202. At 1002, the input image can be received, and a search for recognized objects can be initiated at 1004. In embodiments, at 1004, recognized objects can be searched for directly, or a first classifier can determine locations of recognized classes, before a series of second classifiers determines locations of the recognized objects.

At 1006, tint planes can be generated for each recognized object. At 1008, the user can, in embodiments, be queried to confirm that the appropriate objects were recognized. If the user indicates that one or more objects were not correctly identified, control can return to 1004 for updated search results. In embodiments, the user can also be presented with one or more deduced insights regarding the depicted scene. For example, the user can be asked to confirm that the input image depicts a specific interior or exterior architectural scene (for example, a kitchen). If the user indicates that the deduced scene was incorrectly identified, that information can be used as input to recognize the classes of objects within a scene.

At 1006, the probability map for each tint plane mask image can be determined, as depicted and described below with respect to FIG. 9. At 1012, object masks 302 representing each recognized object 304 can be output.

Figure 9:
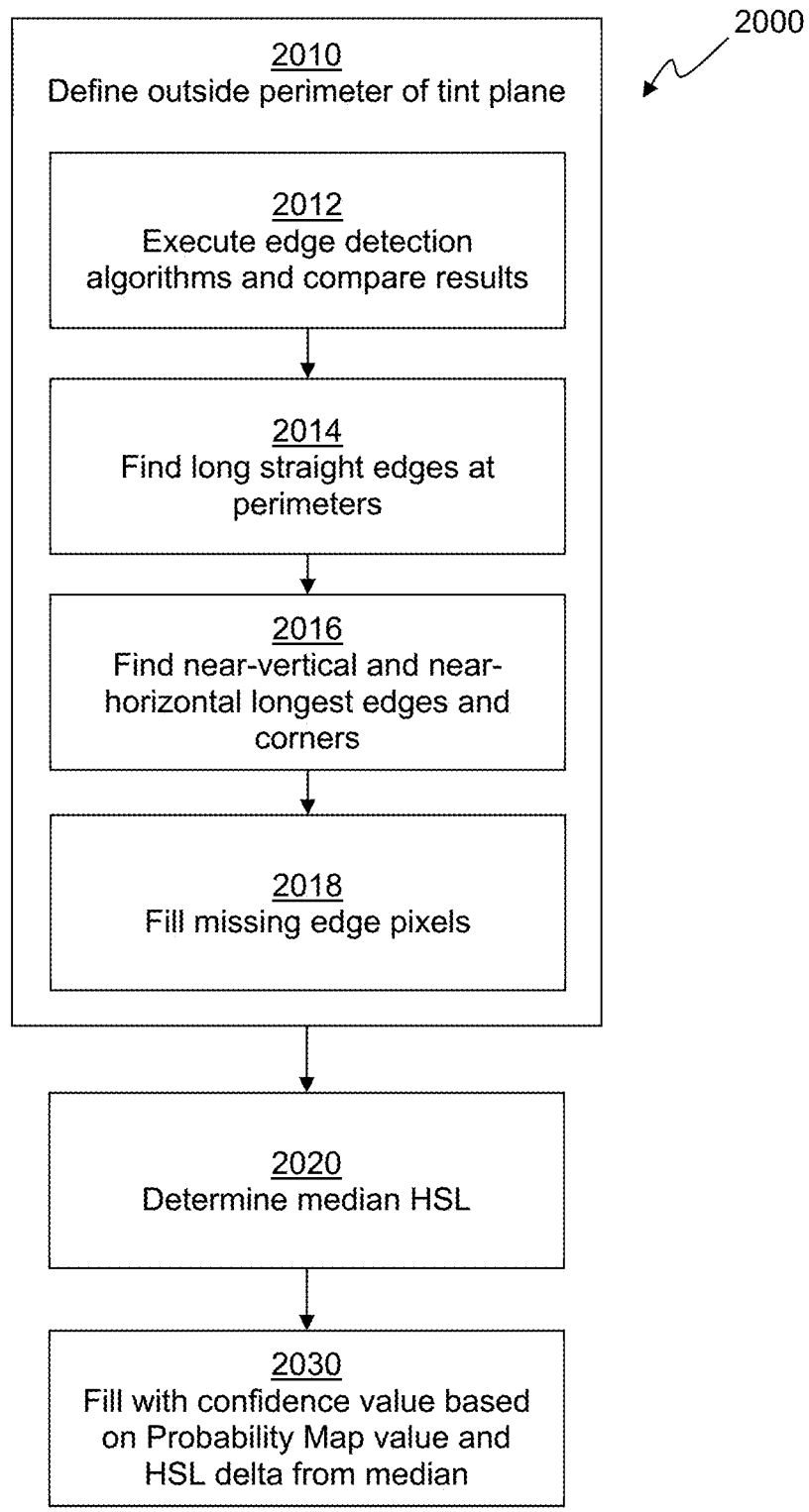
FIG. 9 is a flowchart depicting a method for generating a probability map, according to an embodiment.

FIG. 9 is a flowchart depicting a method 2000 for generating a probability map 308 for each recognized object 304, according to an embodiment. As discussed above, method 2000 can be executed or implemented as part of method 1000 for generating object masks 302.

At 2010, the contiguous outside perimeter boundary, or fence, of the tint plane 306 for a recognized object 304 can be determined by executing at least one edge detection algorithm and comparing the results at 2012, finding long straight edges at the perimeters at 2014, finding near-vertical and near-horizontal longest edges and corners at 2016, and filling missing edge pixels at 2018. More, fewer, or alternative algorithms can be executed to define the outside perimeter by embodiments.

At 2012, the edge detection algorithms can comprise edge detection algorithms known in the art such as canny edge detection, holistically-nested edge detection, and/or the like. The perimeter pixels determined by each edge detection algorithm can be compared to determine pixels that are assumed to be near the perimeter of the mask image. Each edge detection algorithm can be configured based on one or more thresholds. The edge detection thresholds can be predetermined and stored in a memory for use during execution of method 2000, or they can be updated based on feedback received during execution. Long straight lines that form the perimeters of polygonal recognized objects such as architectural surfaces and manufactured objects can also be detected.

At 2014, a feature extraction technique such as the Hough transform can be applied to selected sets of edge pixels in order to find long lines near the perimeter of the mask image. These lines can be used at 2014 to find near-vertical and near-horizontal edges and the corners of the perimeters at 2016. At 2018, the perimeter boundary of each tint plane can be completed by best-guess replacement of missing edge pixels.

At 2020, the median hue, saturation, and luminosity (HSL) values for each pixel in input image 202 that has a value greater than zero in the probability map for the recognized object 304 can be determined.

At 2030, the median HSL values can be used to fill areas of the probability map 308 using a flood-fill algorithm. The flood-fill algorithm can be a conventional algorithm, or a smart fill algorithm. The perimeter boundary of the tint plane 306 can be used as a fence, such that flood-fill operations will terminate when they reach a pixel one the perimeter boundary. Flood-fill operations can begin from pixels with a high score in the probability map 308, and the area that is filled can be capped by the strength of each pixel in the probability map 308 as well as other factors. Additional factors that can be used to determine whether to fill a location include the delta between the location's HSL value and the median HSL value for the tint plane. Further, instead of simply returning a binary value for whether a pixel is or isn't part of a tint plane 306, a weighted value for confidence can be returned. These weighted values can be used to improve the accuracy and fidelity of the rendering operations.

Figure 10:
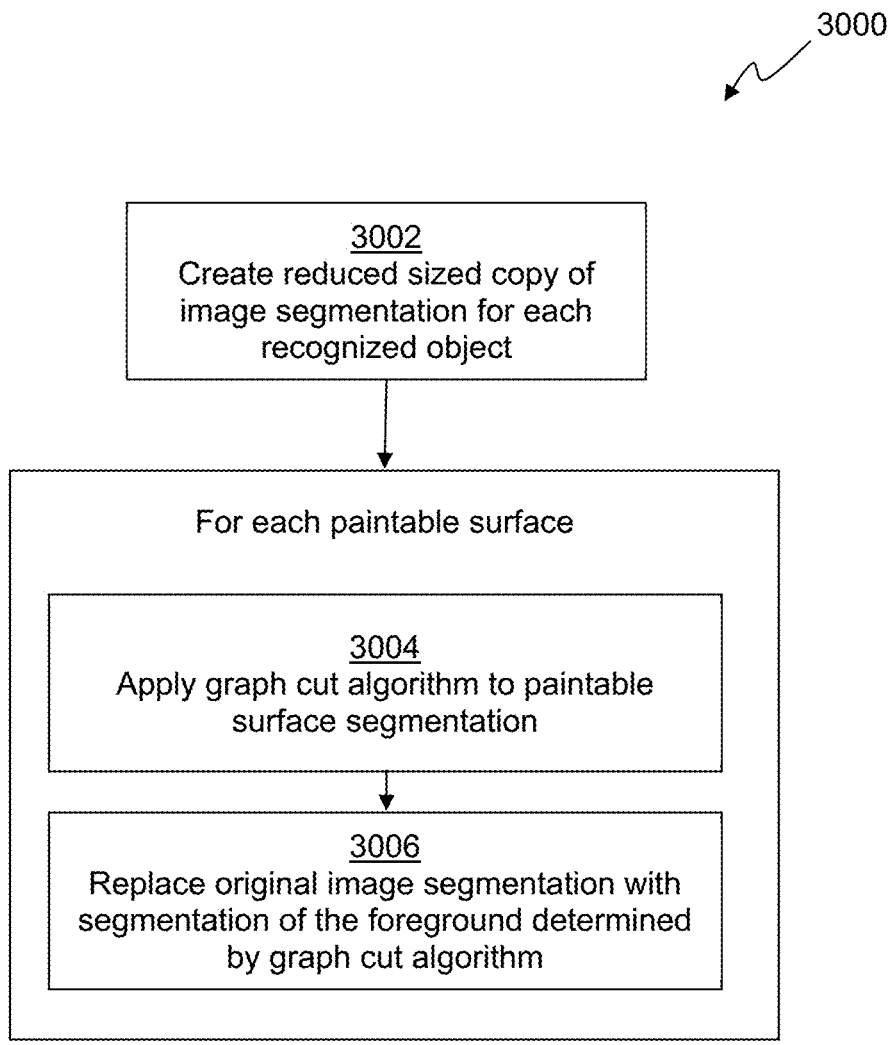
FIG. 10 is a flowchart depicting a method for increasing the accuracy of image segmentations, according to an embodiment.

FIG. 10 is a flowchart depicting a method for refining object masks 302 to improve the accuracy of paintable surface image segmentations associated with recognized objects, as may be used by embodiments.

At 3002, a reduced size copy of each image segmentation is made. The size of the image segmentation can be reduced by about 20% (constrained by minimum and maximum pixel values) with an erode operation.

At 3004, for each recognized object corresponding to a paintable surface, a graph cut algorithm can be applied with a large collection of both foreground and background seed points in order to arrive at an improved image segmentation for that paintable surface. The graph cut algorithm can be a graph-based image segmentation method such those described by Boykov et al. *Graph Cuts and Efficient N-D Image Segmentation*, INTERNATIONAL JOURNAL OF COMPUTER VISION 70(2), 109-131 (2006), though other graph cut algorithms can be used. The eroded image segmentation for the surface can be used as foreground seed points in the graph cut algorithm. The eroded image segmentations for one or more other two paintable surfaces, along with the eroded image segmentations of all the objects recognized by the focus object model can be used as background seed points in the graph cut algorithm.

At 3006, the original image segmentation for the current paintable surface can be replaced with the segmentation of the foreground, as determined by the graph cut algorithm. The difference between the original image segmentation for the current paintable surface and the graph cut result can be limited such that the eroded version of the current paintable surface image segmentation is included in the improved paintable surface segmentation, and the original image segmentation for the current paintable surface is dilated by 20% (constrained by minimum and maximum pixel values). The graph cut algorithm cannot add any pixels to the original image segmentation for the current paintable surface that are outside of the dilated version of the original image segmentation for the current paintable surface. Effectively, this limits the potential growth of the current paintable surface segmentation that the graph cut results can introduce by tethering them to the perimeter of the original image segmentation for the current paintable surface.

Figure 11:
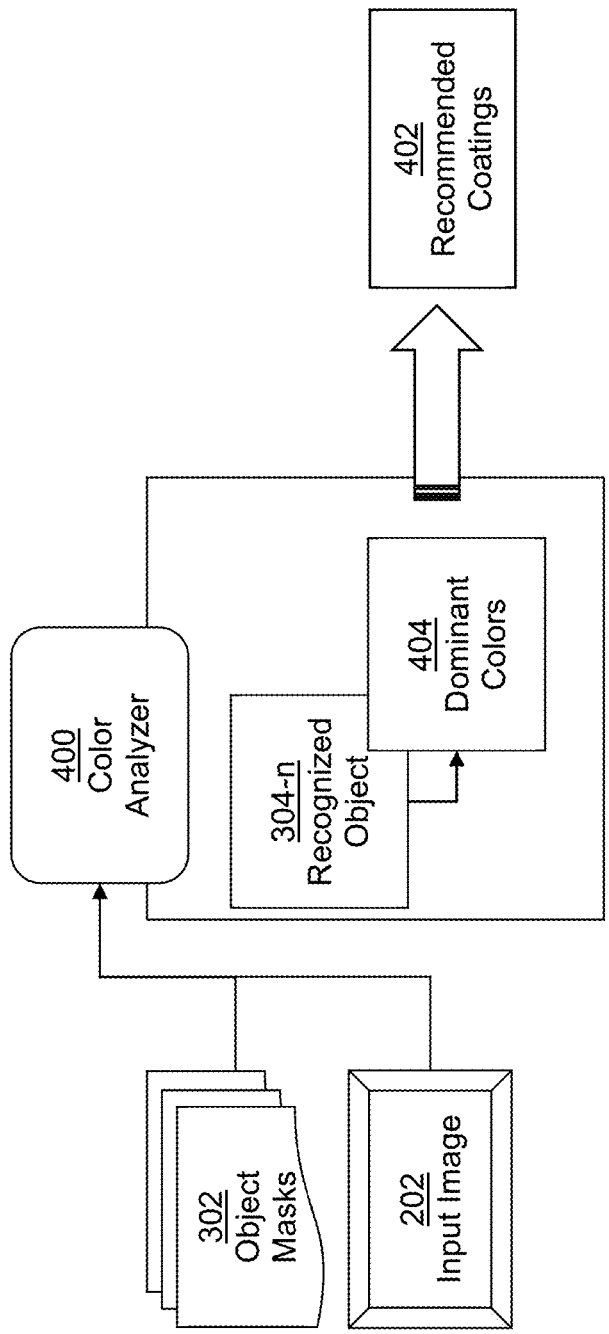
FIG. 11 is a schematic diagram depicting components of a color analyzer, according to an embodiment.

FIG. 11 is a schematic view depicting color analyzer 400. Color analyzer 400 can receive object masks 302 (including any tint planes 306 and probability masks 308) for recognized objects in input image 202 and produce one or more recommended coatings 402. For each recognized object 304 one or more dominant colors 404 can be determined. Recommended coatings 402 can be determined based on the dominant colors 404 of one or more recognized objects 304 within input image 202.

In embodiments, a dominant color 404 of a recognized object 304 can be determined based on color data determined for the pixels within the segment(s) of input image 202 for determined to be part of the recognized object based on object mask 302. For example, the dominant color 404 can be determined based on the median HSL of the pixels of the object. for a tint plane 306 of recognized object 304. Each dominant color can comprise a palette color 120.

Figure 12:
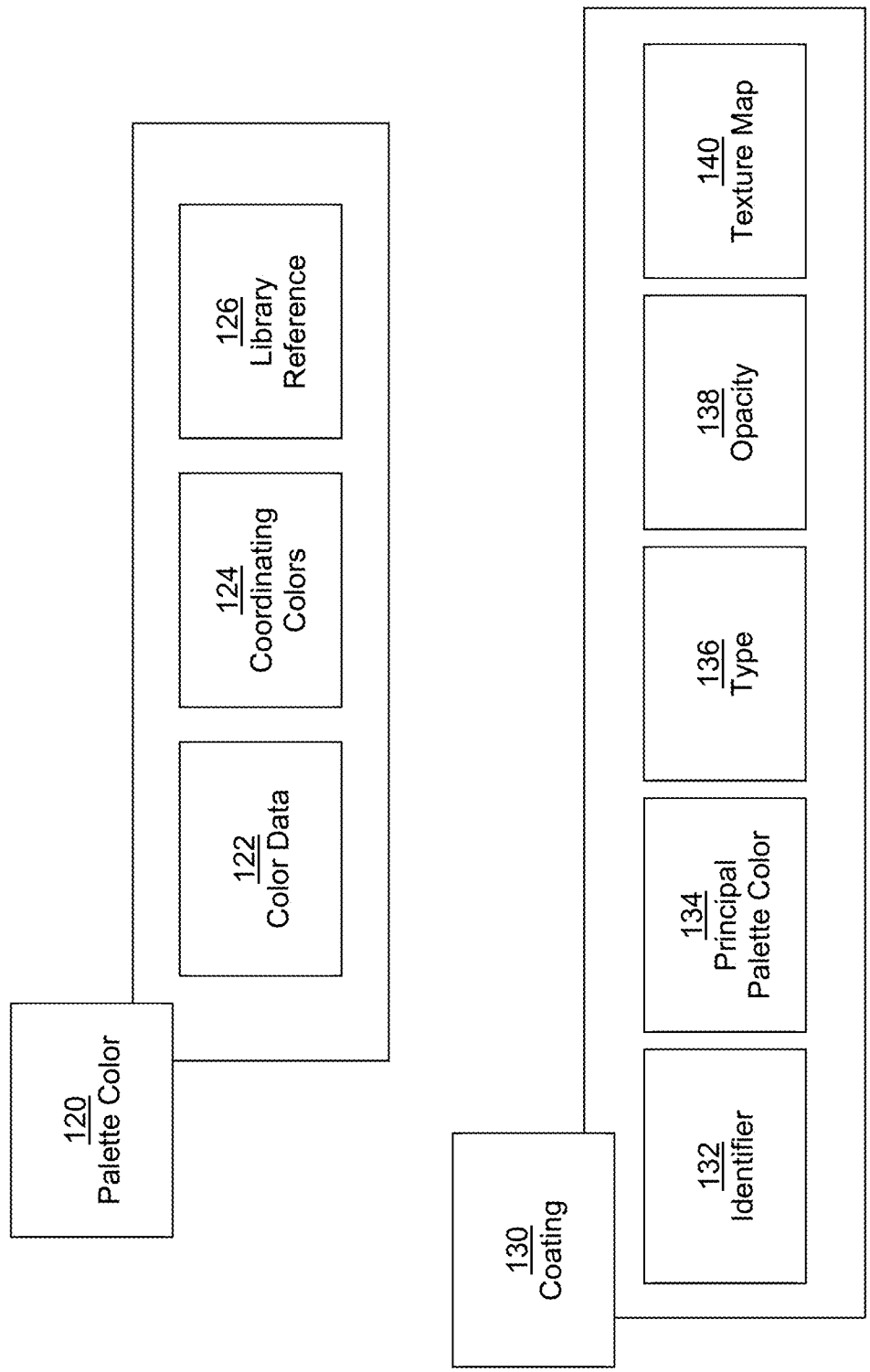
FIG. 12 is a schematic diagram depicting the data structures of palette colors and coatings, according to an embodiment.

FIG. 12 is a schematic diagram depicting structures for storing data related to one or more palette colors 120 and coatings 130 as may be generated, stored, and interacted with in embodiments.

Each palette color 120 can comprise color data 122, which can comprise red/green/blue (RGB), hue/saturation/value (HSV), cyan/magenta/yellow/black (CMYK), or other computer-comprisable color definition format, enabling color 120 to be displayed via user interface 200. Color data 122 can further comprise one or more measurement parameters for use in adjusting measured color information for more accurate detection of a palette color in input image data.

Color data 122 can further comprise one or more tint formulas indicating the combination and relative amounts of pigments to be mixed into a base product in order to produce an applied color corresponding to palette color 120.

Each palette color 120 may have associated tint formulas for each of a variety of base products, such that each base product can be tinted to produce the color when applied to a surface.

Palette color 120 can further comprise a set of references to one or more coordinating colors 124. Coordinating colors 124 can be precalculated and stored with color 124 or determined algorithmically at runtime. Coordinating colors 124 can be stored in a lookup table of coordinating colors in data store 110. Coordinating colors can be determined in various ways; for example, coordinating colors can be calculated from the color characteristics (e.g., red, green, and blue levels) of the selected color, determined from past user selections, or determined using other criteria, such as the colors of a school or other institution, the colors of a logo, the colors associated with a sports team, and the like.

Certain palette colors 120 can be members of one or more color libraries, which can be predefined. In an embodiment, library reference 126 can comprise data linking palette color 120 to libraries, and can further include a names, numbers, and/or other identifying indicia for the palette color within context of the library. Library reference 126 can also include one or more color matrix locations. Each color matrix location can indicate the relative arrangement of palette color 120 in a color matrix for display via user interface 200, or as arranged in a physical paint chip display or swatch book.

Each palette color 120 can be predefined, for example, as a member of one or more color libraries, or can be generated based on color measurement data provided by a user, detected within input images, and/or provided by one or more color sensing or measuring devices such as colorimeters and/or spectrophotometers.

Coating 130 can represent a paint, stain, texture, or other item or surface treatment, for simulated application by embodiments of the present disclosure. According to an embodiment, each coating 130 can be presented by a data structure comprising an identifier 132, a type 136, a principal palette color 134, opacity information 138, and a texture map 140. In embodiments, identifier 132 can be a model or product number or name, or can be associated with a standard color scheme such as the PANTONE color scheme. Type 136 can indicate a category or style of coating represented. For example, types can include "paint," "stain," or "texture." Embodiments can further support subtypes such as "gloss paint," "matte paint," "opaque stain," "translucent stain," or the like.

Principal palette color 134 can be the main color of a coating that may have multiple pigment colors, or may take on multiple colors based on the surface substrate. For example, for coatings of type "paint," the principal palette color 134 may comprise color information that is based on the color of the main pigment in the coating.

Opacity information 138 of a coating can be a single value, for example, 100% for opaque paints and stains, or can comprise image data with each pixel having varying alpha or other values to indicate uneven transparency. Texture map 140 can comprise image data with each pixel having a parameter value determined based on high or low points in the texture of the coating 130. The image data for opacity 138, and texture map 140, if present, can comprise tileable images, such that the image data can be repeated across a region of pixels in the painted image 502.

In embodiments, coatings 130 can correspond with one or more existing or proposed products, and the data regarding coatings 130 can be retrieved from a product information system included within, or remote from, system 100. Coatings can further comprise, or be convertible to, scalable vector graphics (SVG) filter primitives.

Figure 13:
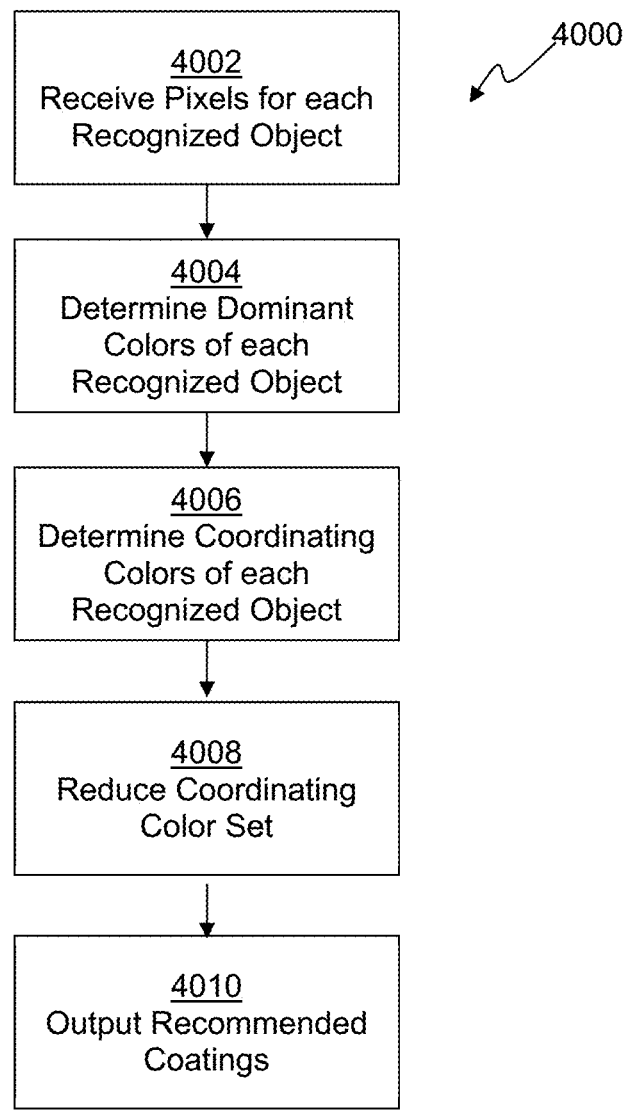
FIG. 13 is a flowchart depicting a method for determining recommended coatings, according to an embodiment.

FIG. 13 is a flowchart depicting a method 4000 for determining recommended coatings for a scene depicted in an input image. At 4002, pixels associated with each recognized object are received. In embodiments, an object mask is received for each recognized object and the pixels of the input image identified as part of the object are received. Alternatively, an object segment representing only the pixels of each recognized object can be received. At 4004, the dominant colors of each recognized object can be determined. Each dominant color can have a corresponding palette color 120. In embodiments, dominant colors can be selected from palette colors 120 in an existing color library or can be stored as scene-specific palette colors.

At 4006, a set of coordinating colors for each recognize object can be determined. In embodiments, coordinating colors can be selected from predetermined coordinating colors 124 of palette colors 120. Coordinating colors may also be calculated based on color data of each palette color. While any number of coordinating colors can be determined, in embodiments the number of coordinating colors determined for each dominant color can be between two and four.

At 4008, a reduced set of coordinating colors for the scene can be determined. The reduced set of coordinating colors can include between three and six coordinating colors, though any number of coordinating colors for the scene can be produced. Embodiments can use a variety of methods to select the reduced set of coordinating colors. For example, in an embodiment, coordinating colors for the scene can be chosen by randomly selecting from the coordinating colors of each recognized object. Coordinating colors for the scene can also be chosen by selecting a single coordinating color for each recognized object. Alternatively, the coordinating colors for the scene can be chosen by executing an optimization routine to select the set of coordinating colors that results in the most mutually coordinating colors—in other words, each coordinating color in the scene could ideally be a coordinating color of each other coordinating color in the scene. In embodiments, user interface 200 can enable user to manually select coordinating colors, for example, for enabling user to select one or more recognized objects to use (or ignore) for the purposes of determining recommended colors.

At 4010, a set of recommended coatings can be produced such that each recommended coating is a coating 130 having a principal palette color 134 that corresponds to one of the recommended colors for the scene. Each recommended coating can be selected based on the coordinating colors, the types of the recognized objects, and the detected room type. In one embodiment, a lookup table can indicate characteristics such as a base product and sheen of coatings that can be beneficial to recommend for rooms a certain type. As an example, the kitchen room type can be associated with gloss or semi-gloss paint products. Alternatively, more deeply pigmented (darker) principal palette colors can be associated with matte or eggshell paint products.

Figure 14A:
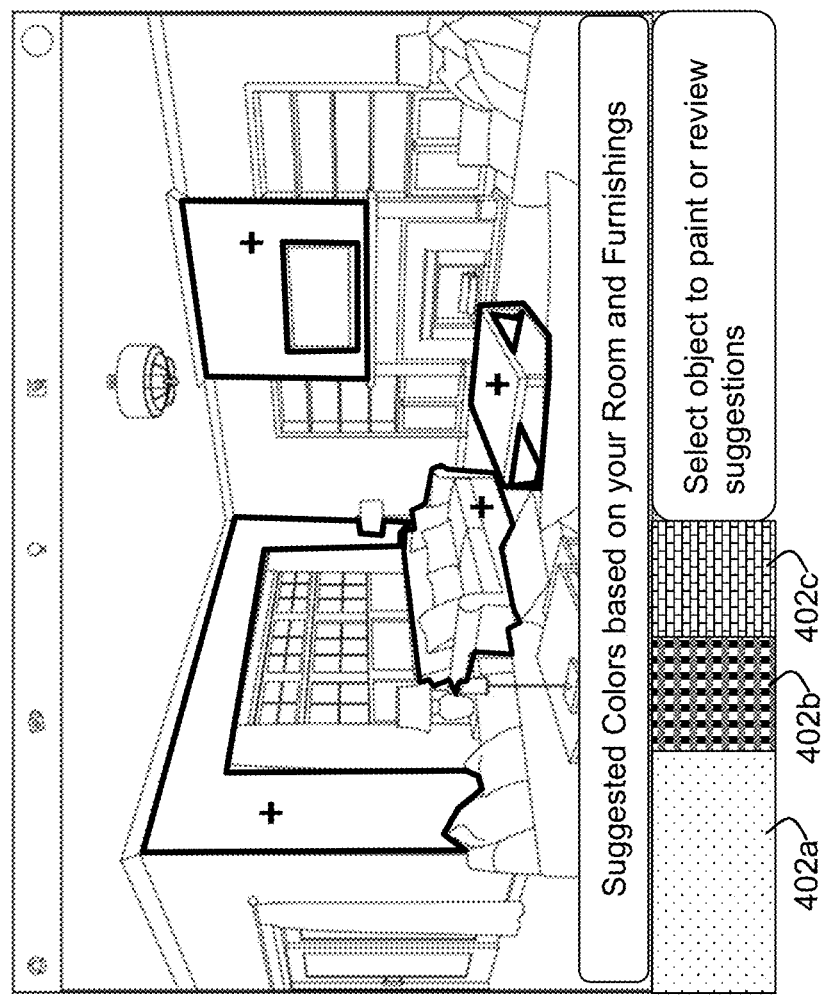
FIGS. 14A and 14B are mockups depicting example user interface screens, according to an embodiment.
Figure 14B:
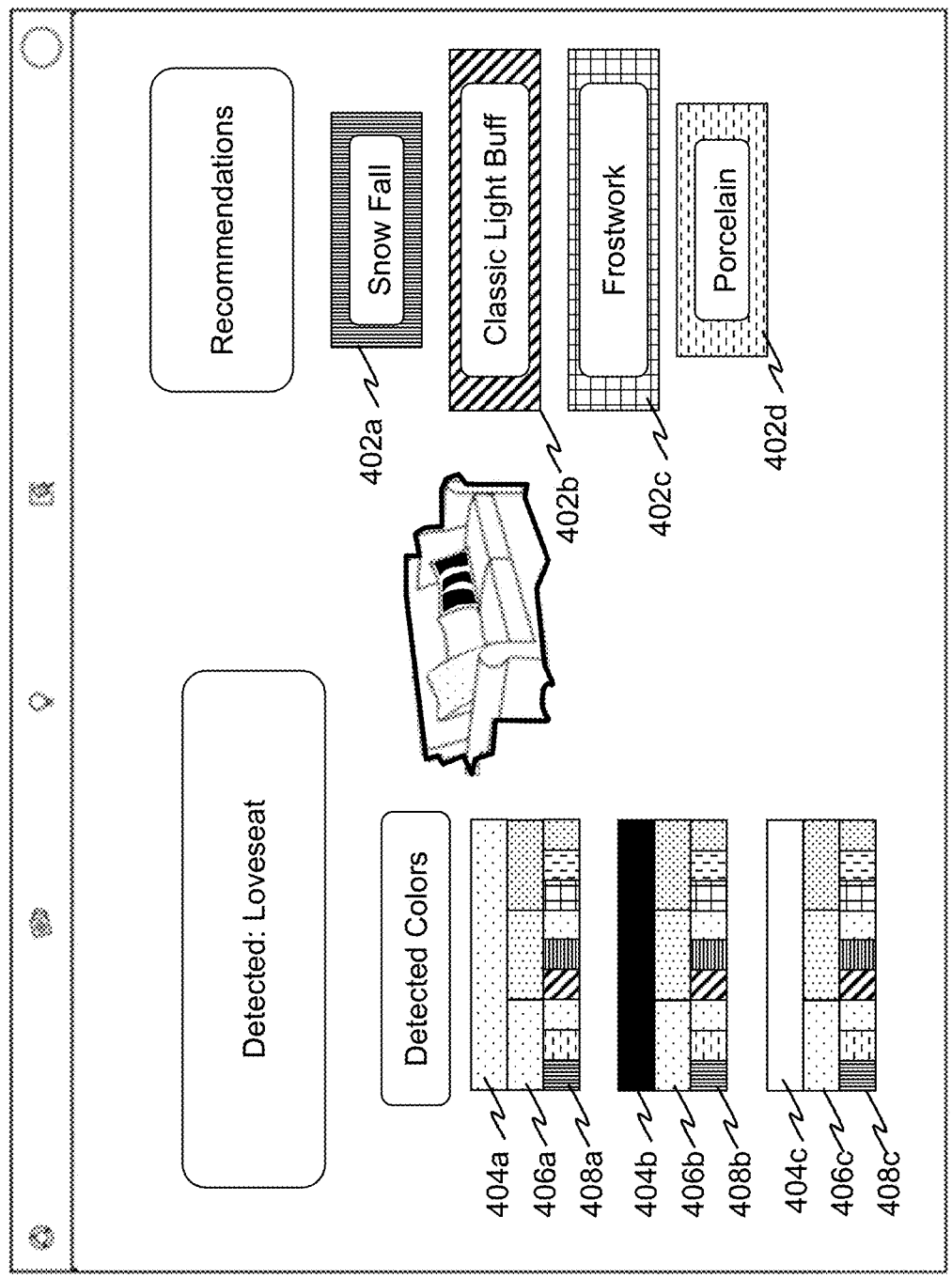

FIGS. 14A-14B depict sample user interface screens enabling user interaction with color recommendations, according to embodiments. As depicted in FIG. 14A, a screen can be provided that provides coating recommendations 402 based on detected colors within input image 202. The user can select an object to paint (per FIG. 3F), or to review the detected and recommended colors. As depicted in FIG. 14B, one or more dominant colors 404 can be presented to the user. Each dominant color 404 can be associated with a palette color 120. Close matches 406 for each dominant color can be provided. Close matches 406 can be palette colors 120 in a preexisting color library, for example, existing colors in a paint product line. One or more coordinating colors 408 can be provided for each close match 406. Each recommended coating 402 can have a principal palette color 134 associated with a palette color 120.

Figure 15:
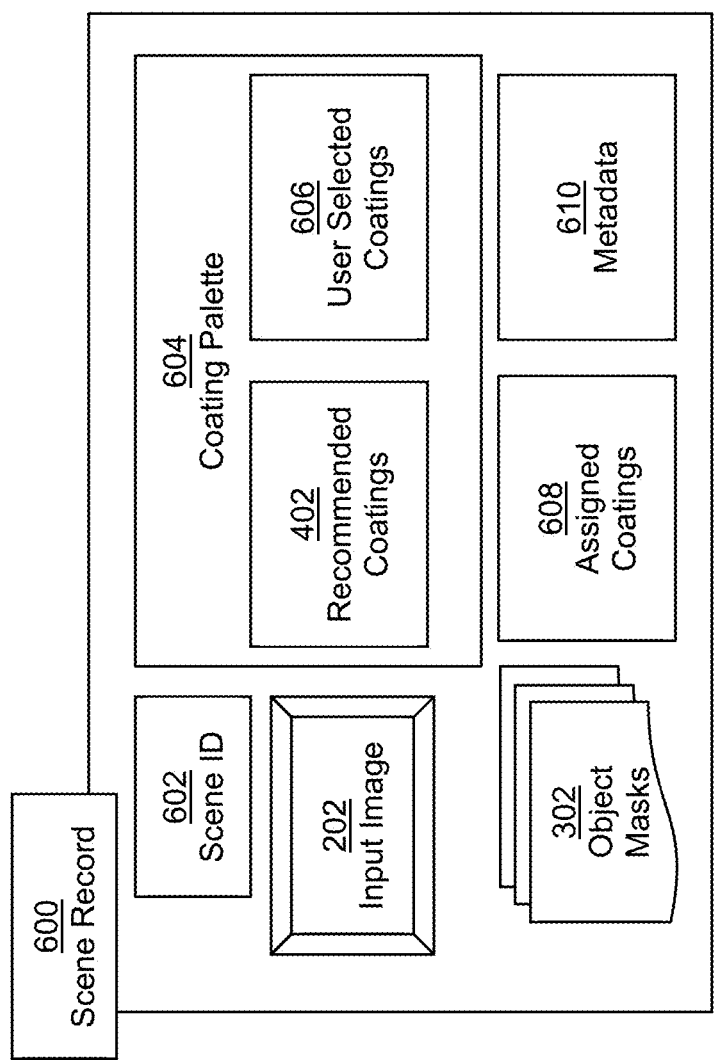
FIG. 15 is a schematic diagram depicting the data structure of a scene record, according to an embodiment.

FIG. 15 is a schematic view depicting data elements of a scene record 600, as may be generated, stored, and accessed by embodiments. Scene record 600 can either directly or indirectly store data related to a visualizer scene comprising input image 302, and associated object masks 302. In embodiments, scene record 600 can comprise a plurality of input images 302.

Scene record 600 can comprise scene identifier 602 which can be a globally unique identifier (GUID), cryptographic hash, or any other value enabling identification of a specific scene record 600. In embodiments, scene identifier 602 can comprise a uniform resource identifier (URI) or uniform resource locator (URL) that can be provided by client user interfaces 200 to server 104 to enable lookup and access of scene record 600. Scene record 600 can be stored in data store 110 in order to enable persistence of scenes between sessions.

Scene record 600 can further comprise coating palette 604, which can include recommended coatings 402 as generated by color analyzer 400, and/or one or more user selected coatings 606.

Figure 16:
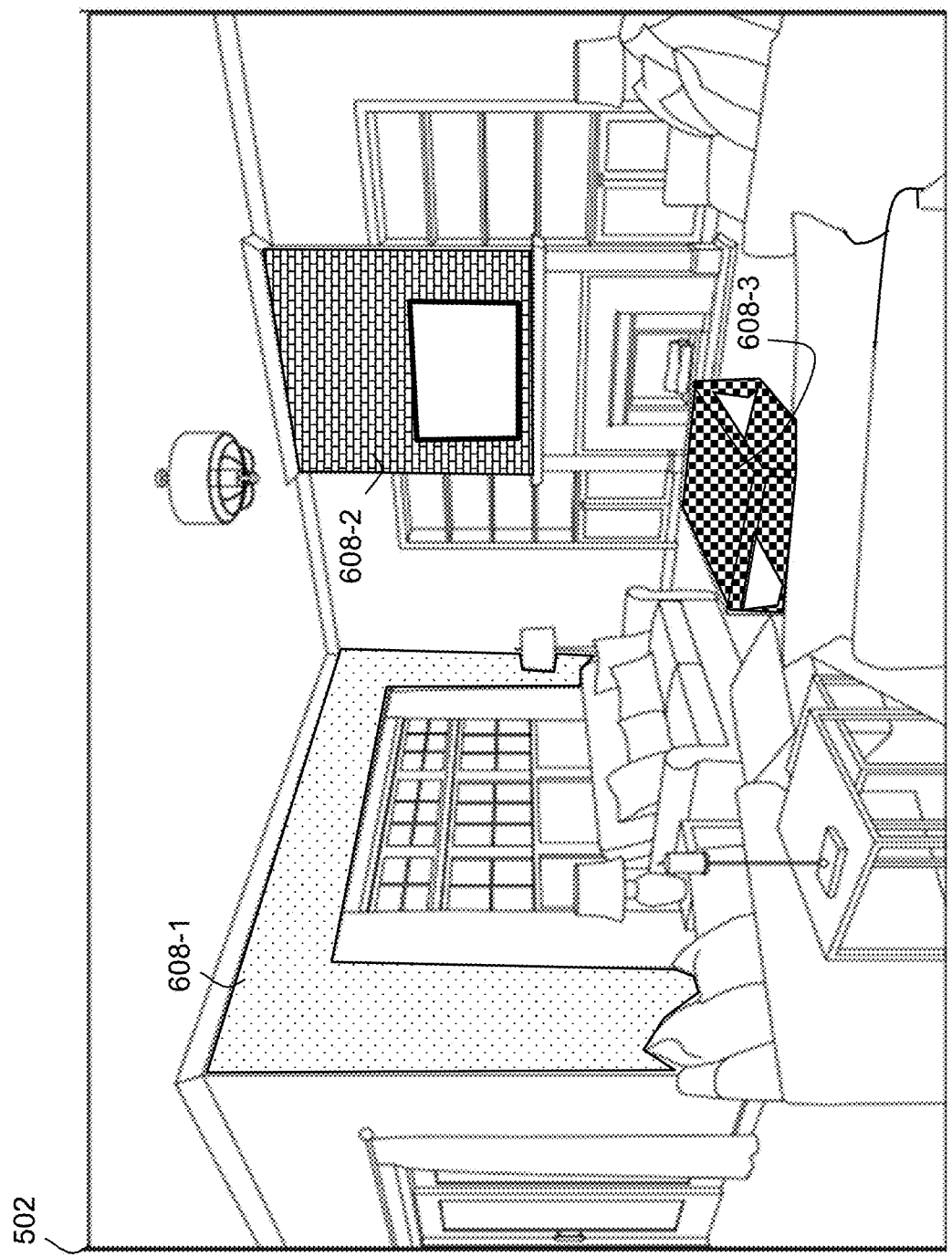
FIG. 16 is a mockup depicting an example user interface screen, according to an embodiment.

Scene record 600 can comprise data defining assigned coatings 608. Each assigned coating 608 can comprise a link between a recognized object 304 (having associated object mask 302) and a coating 130. For example, as depicted in the example painted image 502 of FIG. 16, regions corresponding to the recognized objects of the example depicted in FIGS. 3A-3F have been painted with a first assigned coating 608-1, second assigned coating 608-2, and third assigned coating 608-3. Each coating 130 can be stored in or associated with a coating within coating palette 604.

Scene record 600 can further comprise metadata 610, enabling additional data elements to be stored or associated with scene record 600 in embodiments. Metadata 610 can include scene thumbnail images, scene descriptions, and scene titles. In embodiments, scene record 600 can include one or more scene versions which can be individually named or referenced with timestamps. Each version can further include a description.

Figure 17:
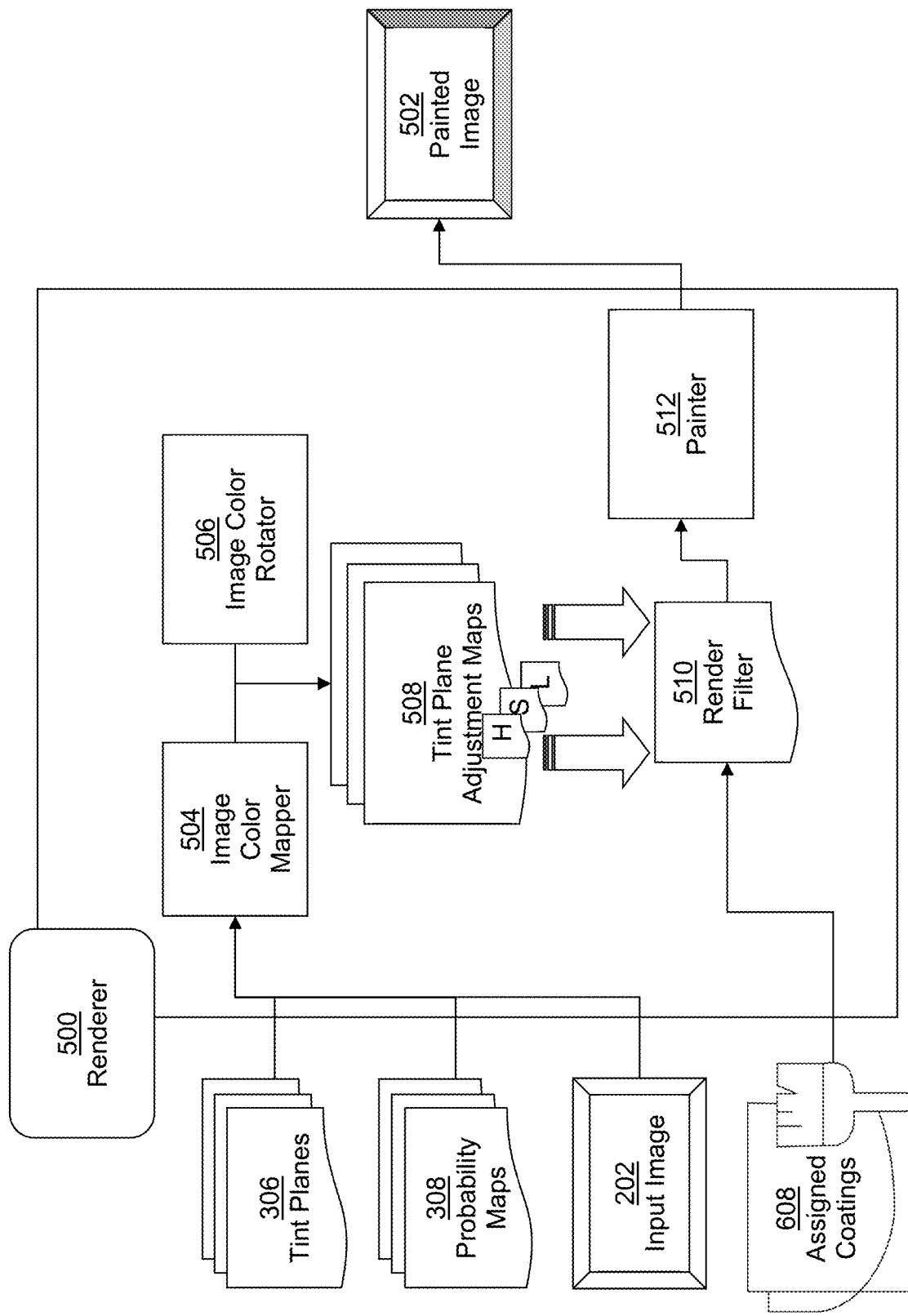
FIG. 17 is a schematic diagram depicting components of a renderer, according to an embodiment.

FIG. 17 is a schematic view depicting components of renderer 500, according to an embodiment. Renderer 500 can receive input image 202, object masks 302, and assigned coatings 608 (optionally, via scene record 600) to produce painted image 502.

Image color mapper 504 can perform a first normalization of the pixels within the probability map 308 of each object mask 302, to determine a first luminosity adjustment to be made to each pixel of the probability map to normalize the lightness within a given recognized object. In a second normalization, image color mapper 504 can further determine a second luminosity adjustment to be made between the probability maps 308 of all of the object masks 302. Image color rotator 506 can use the first and second luminosity adjustments to produce tint plane adjustment maps 508 for each tint plane 306. Each tint plane 306 can have one or more tint plane adjustment maps 508 defined. A hue map can identify regions of the object that contain the object's primary color (as identified by analysis of each pixel within the tint plane) and/or near-matches of the primary color. A highlight map can identify regions of the object that contain unusually luminous areas relative to the tine plan as a whole. Objects that are identified as being bright overall (such as an illuminated lamp) may not have a highlight map. A lightness normalization map can contain a lightness-adjusted version of the object bounded by the tint plane that is used as a foundation for applying a assigned coating 608. An analysis performed on all tint planes can determine the target lightness value for the normalization of the object in relation to its peers. Each tint plane adjustment map 508 can be Base64 image data such as a binary image file comprising an scalable vector graphics (SVG) filter primitive, as defined by any version of the W3C Scalable Vector Graphics Specification, though other filter formats can be used.

The tint plane adjustment maps 508 can be combined with the assigned coating 608 to create render filter 510, which can be a SVG filter. Those of ordinary skill in the arts will appreciate that multiple SVG filter primitives can be combined to define a composite SVG filter that can be applied to an input image. In an embodiment, render filter 510 can comprise a masked image, applying the same variations of hue, saturation, and luminosity that were present in input image 202, but applied to the assigned coating 608, in place of each object's primary color.

Painter 512 can be a client application configured to receive render filter 510, input image 202 and assigned coating 608 to produce painted image 502 by overlaying each pixel of input image 202 with a painted pixel with values determined based on render filter 510 and assigned coating 608. Painter 512 can comprise a web browser or other application configured to display on the screen of a user device and one or more client-side elements for interacting with and updating the document object model (DOM) as interpreted by the browser.

In embodiments, painter 512 can utilize the Canvas application programming interface (Canvas API). Canvas elements in HTML documents can provide instructions to a web browser or other HTML client-side interface to render an image with modifiers, such as render filter 510 and/or assigned coating 608 applied. In embodiments, input image 202 can be provided as an ImageBitmap object within a Canvas element, and render filter 510 can be provided as one or more CanvasFilter objects within the canvas element.

FIGS. 18A and 18B are code listings depicting an example HTML markup that can be produced by painter 512 in one embodiment. As depicted, input image 202 is depicted as an image (img) element at line 1. Render filter 510 is defined at lines 4-15 as a filter element "filter_0." As depicted, render filter 510 includes assigned coating 608 defined as a flat color feFlood element (line 5) and an feBlend element at line 14. Tint plane adjustment maps 508 are depicted as feImage elements (lines 6 and 7). Painted image 502 is depicted at lines 21-22 as an SVG element filtered by render filter 410, and masked by a mask image "mask_0" defined based on tint plane adjustment map 508 such that only the tint plane pixels that meet a threshold confidence value are displayed over input image 202.

In one embodiment, tint planes 306, probability maps 308, and tint plane adjustment maps 508 can be generated on a server computing system. These can be generated a single time when input image 202 is first uploaded. These artifacts can be stored in a networked data store (such as a database or file system), or in embodiments can be stored on a client in HTML5 web storage. Painter 512 can comprise client-side components (such as JavaScript (React) code) that can generate HTML representing render filter 510 each time the user selects a different coating. The browser or other client-side applicant can then natively repaint the DOM to reflect the updated filters.

Figure 19:
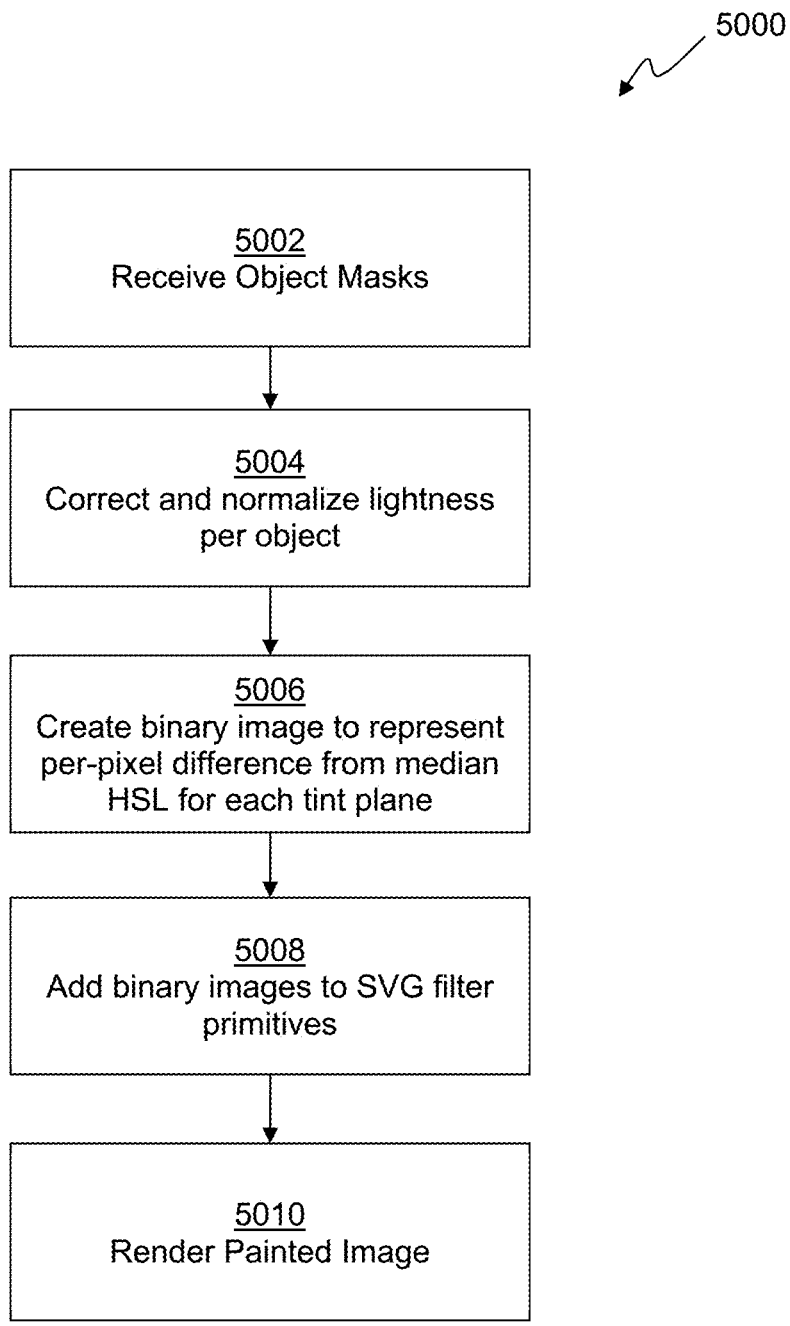
FIG. 19 is a flowchart depicting a method for rendering a painted image, according to an embodiment.

FIG. 19 depicts a method 5000 for rendering a painted image according to an embodiment. At 5002 the object masks 302, including tint planes 306 and probability maps 308 can be received. At 5004, lightness can be corrected and normalized per object. At 5006, binary images can be created to represent the per-pixel difference from the median HSL for each tint plane. At 5008, the binary images can be added to SVG filter primitives, which can be used at 5010 to render the painted image 502.

System 100 can be implemented with, and hosted by, a client-server architecture. One such architecture that can be used according to an embodiment is in depicted FIG. 20. Client 102 can comprise a web application, or other application for execution on a computing device such as a personal computer, mobile phone, tablet, or other device, and can implement or house user interface 200 and renderer 500. In embodiments, various components of client 102 can be generated or executed on a computing device associated with a user, while other components can be executed by an application server or other service providing computing system that is remote or separate from the user device. Embodiments of client 102 can be implemented in a version of JavaScript such as ECMAScript 6 (or ES6), as defined by the European Computer Manufacturers Association (ECMA) in the ECMA-262 and ISO/IEC 16262 standards, though other languages can be used. Client 102 can comprise a Flow static type checker, and execute within contexts provided by a Redux.js application container. User interface 200 can be provided, at least in part, via a React.js user interface library using Syntactically Awesome Style Sheets (Sass), with rendering provided through HTML5 Canvas with SVG Compound filters and BabylonJS and WebGL for two and three-dimensional rendering.

Server 104 can comprise one or more applications providing data and/or processing services to client 102 for execution on one or more computing systems. Server 104 can implement or house mask generator 300 in embodiments. Server 104 can be implemented using Node.js using a Fastify framework. Mask generator 300 can be implemented using DeepLab to define and execute Tensorflow models. Methods provided by the OpenCV framework can be used to improve and refine the image mask returned by machine learning models. Server 104 can further comprise a data store, such as a MongoDB, or other database. Server 104 can further use or be implemented in conjunction with Google Visual Inspect AI.

While components or the entireties of client 102 and server 104 can be implemented and hosted across separate computing systems, any number of computing systems can be used in embodiments.

FIG. 21 is a schematic diagram depicting an architecture for providing a shared scene visualizer according to an embodiment. As depicted a first client user interface 200a and a second client user interface 200b are communicatively coupled with server 104 for access to scene record 600.

As user activity results in updates to the data elements of scene record 600, each client user interface 200 can be notified of updates to scene record 600, such that painted image 502 and other user interface elements can be automatically updated in real time or near real time, in synchronous or asynchronous fashion The shared scene visualizer provided by embodiments enables clients to communicate via a shared unique uniform resource identifier (such as a uniform resource locator—URL). Embodiments enable users to frictionlessly collaborate with and receive social confirmation of color choices from other users accessing the same scene record 600.

Server 104 can provide anonymous access to scene record 600, or implement an authentication scheme in embodiments. For example, server 104 can maintain one or more user accounts requiring authentication credentials for sign on, and each scene record 600 can have users assigned with view, edit or administrative access. In other embodiments, each scene record 600 can have an associated passcode, such that anonymous access is still permitted by users who have both the URL or other identifier and the passcode.

In embodiments, coating palette 604 can include colors or coatings specific to scene record 600, or from a global color palette, such as a color library. The state of each visualizer and each color palette is persisted between sessions.

Scene record 600 can comprise multiple combinations of assigned coatings 608, which can each be named and saved such that scene record 600 can comprise multiple scene versions. User interface 200 can comprise one or more controls enabling a user to activate a selected scene version.

Each client user interface 200 can provide the URL to the user, and include interface elements comprising calls to action to invite the user to share the URL, scene thumbnail image(s), scene description, and scene title via one or more social media platforms. In embodiments, each scene version can be associated with a polling mechanism such that specific scene versions to be voted up or down by users. The polling mechanism for a scene record can be provided a separate URL.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A coating product selection system comprising:
   one or more memories and one or more processors configured to:
   receive an input image,
   perform searches to detect a plurality of recognized objects depicted in the input image;
   generate a plurality of first image segments, each respective first image segment of the plurality of first image segments comprising pixels of the input image that depict a respective recognized object of the plurality of recognized objects and not pixels of the input image that do not depict the respective recognized object;
   generate a plurality of eroded image segmentations for paintable surfaces corresponding to respective ones of the recognized objects, wherein the eroded image segmentations for the paintable surfaces comprise reduced size copies of the first image segments;
   replace the plurality of first image segments with a plurality of second image segments, wherein to replace the plurality of first image segments with the plurality of second image segments, the one or more processors, for each respective recognized object of the plurality of recognized objects:
   apply a graph cut algorithm to generate a second image segment, of the plurality of second image segments, for a respective paintable surface, wherein:
   the respective paintable surface corresponds to the respective recognized object,
   the graph cut algorithm uses a plurality of foreground seed points and a plurality of background seed points,
   an eroded image segmentation, of the plurality of eroded image segmentations, for the respective paintable surface is used as the foreground seed points, and eroded image segmentations, of the plurality of eroded image segmentations, for paintable surfaces corresponding to other ones of the recognized objects are used as the background seed points; and replace a first image segment, of the plurality of first image segments, for the respective paintable surface with the second image segment for the respective paintable surface;

for at least a first recognized object of the plurality of recognized objects, determine one or more dominant colors of the first recognized object from a second image segment, of the plurality of second image segments, for the first recognized object;

determine one or more recommended coating products, each of the one or more recommended coating products having a color selected to coordinate with at least one of the one or more dominant colors of the first recognized object;

present, on a display, a user interface containing elements that show colors of a plurality of coating products, wherein the colors of the plurality of coating products include the colors of the one or more recommended coating products; and receive a user selection of a selected coating product from among the plurality of coating products.

2. The coating product selection system of claim 1, wherein the one or more processors are configured to apply a classification model trained to identify a room type of the input image and wherein each of the one or more recommended coating products has a product type selected based on the identified room type.

3. The coating product selection system of claim 2, wherein the classification model is trained to identify the room type selected from a group of room types consisting of: kitchen, living room, dining room, bedroom, bathroom, laundry room, mud room, office, nursery, and recreation room.

4. The coating product selection system of claim 1, wherein the one or more processors are configured to perform the searches by providing the input image to an image segmentation model trained to identify pixels corresponding to at least one class of focus objects.

5. The coating product selection system of claim 1, wherein the one or more processors are configured to determine the one or more dominant colors from the plurality of recognized objects.

6. The coating product selection system of claim 5, wherein the one or more processors are configured to determine the one or more dominant colors from a subset of the plurality of recognized objects.

7. The coating product selection system of claim 1, wherein the one or more dominant colors are determined based on colors within a pre-existing color library stored in the one or more memories.

8. The coating product selection system of claim 1, wherein each of the one or more recommended coating products has a color corresponding to a color within a pre-existing color library stored in the one or more memories.

9. The coating product selection system of claim 1, wherein:

wherein the user interface is configured to receive a user selection of one or more coating assignments, each of the one or more coating assignments comprising a selected coating product and a selected paintable image segment corresponding to a paintable image segment of the plurality of recognized objects; and the one or more processors are further configured to generate a painted image, each pixel of the painted image having a painted color determined to be the same color as a corresponding pixel of the input image if the pixel is not within a paintable image segment of at least one of the one or more coating assignments and determined based on the selected coating product of a coating assignment of the one or more coating assignments if the corresponding pixel of the input image is within the paintable image segment of the coating assignment.

10. The coating product selection system of claim 9, wherein the one or more processors are configured to detect the plurality of recognized objects by applying an image segmentation model trained to the input image to identify classes of surfaces selected from a group consisting of: wall surfaces, ceiling surfaces, and trim surfaces.

11. A computer-implemented method for selecting and displaying a coating product, the computer-implemented method comprising:

receiving, by one or more processors, an input image;

performing, by the one or more processors, searches to detect a plurality of recognized objects depicted in the input image;

generating, by the one or more processors, a plurality of first image segments, each respective image segment of the plurality of first image segments comprising pixels of the input image that depict a respective recognized object of the plurality of recognized objects and not pixels of the input image that do not depict the respective recognized object;

generating, by the one or more processors, a plurality of eroded image segmentations for paintable surfaces corresponding to respective ones of the recognized objects, wherein the eroded image segmentations for the paintable surfaces comprise reduced size copies of the first image segments;

replacing, by the one or more processors, the plurality of first image segments with a plurality of second image segments, wherein replacing the plurality of first image segments with the plurality of second image segments comprises, for each respective recognized object of the plurality of recognized objects:

applying a graph cut algorithm to generate a second image segment, of the plurality of second image segments, for a respective paintable surface, wherein:

the respective paintable surface corresponds to the respective recognized object, the graph cut algorithm uses a plurality of foreground seed points and a plurality of background seed points, an eroded image segmentation, of the plurality of eroded image segmentations, for the respective paintable surface is used as the foreground seed points, and eroded image segmentations, of the plurality of eroded image segmentations, for paintable surfaces corresponding to other ones of the recognized objects are used as the background seed points; and replacing the first image segment for the respective paintable surface with the second image segment for the respective paintable surface;

for at least a first recognized object of the plurality of recognized objects, determining, by the one or more processors, one or more dominant colors of the first recognized object from a second image segment, of the plurality of second image segments, for the first recognized object;

determining, by the one or more processors, one or more recommended coating products, each of the one or more recommended coating products having a color selected to coordinate with at least one of the one or more dominant colors of the first recognized object;

presenting, by the one or more processors, on a display, a user interface containing elements that show colors of a plurality of coating products, wherein the colors of the plurality of coating products include the colors of the one or more recommended coating products; and receiving, by the one or more processors, a user selection of a selected coating product from among the plurality of coating products.

12. The computer-implemented method of claim 11, wherein performing the searches comprises providing the input image to a classification model trained to identify a room type of the input image and wherein each of the one or more recommended coating products has a product type selected based on the identified room type.

13. The computer-implemented method of claim 12, wherein the classification model is trained to identify the room type selected from a group of room types consisting of: kitchen, living room, dining room, bedroom, bathroom, laundry room, mud room, office, nursery, and recreation room.

14. The computer-implemented method of claim 11, wherein performing the searches comprises providing the input image to an image segmentation model trained to identify pixels corresponding to at least one class of focus objects.

15. The computer-implemented method of claim 11, wherein determining the one or more dominant colors of the first recognized object comprises determining colors within a pre-existing color library stored in one or more memories that correspond to color data of pixels in the second image segment.

16. The computer-implemented method of claim 11, wherein each of the one or more recommended coating products has a color corresponding to a color within a pre-existing color library stored in one or more memories.

17. The computer-implemented method of claim 11, further comprising:

receiving, by the one or more processors, at the user interface, a user selection of one or more coating assignments, each of the one or more coating assignments comprising a selected coating product and a selected paintable image segment corresponding to a paintable image segment of the plurality of recognized objects; and generating, by the one or more processors, a painted image for display at the user interface, each pixel of the painted image having a painted color determined to be the same color as a corresponding pixel of the input image if the pixel is not within a paintable image segment of at least one of the one or more coating assignments and determined based on the selected coating product of a coating assignment of the one or more coating assignments if the corresponding pixel of the input image is within the paintable image segment of the coating assignment.

18. The computer-implemented method of claim 17, wherein detecting the plurality of recognized objects comprises providing the input image to an image segmentation model trained to identify classes of surfaces selected from a group consisting of: wall surfaces, ceiling surfaces, and trim surfaces.

* * * * *